(12) United States Patent
Ishimoto

(10) Patent No.: US 6,185,384 B1
(45) Date of Patent: Feb. 6, 2001

(54) IMAGE FORMING APPARATUS WITH CONTROLLER TO ACTIVATE THE IMAGE FORMING UNIT DEPENDING ON LIGHT SOURCE CYCLE-UP TIME

(75) Inventor: Koichi Ishimoto, Yokohama (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/339,868

(22) Filed: Jun. 25, 1999

(30) Foreign Application Priority Data

Jun. 29, 1998 (JP) .................................................. 10-196472

(51) Int. Cl.[7] .................................................. G03G 15/00
(52) U.S. Cl. .............................. 399/47; 399/51; 358/300
(58) Field of Search ................................ 358/300, 504, 358/475; 399/47, 51, 43, 32, 177; 347/129, 224

(56) References Cited

U.S. PATENT DOCUMENTS

| | | | |
|---|---|---|---|
| 5,153,745 | * 10/1992 | Brandkamp et al. | 358/406 |
| 5,610,480 | * 3/1997 | Takayanagi | 315/308 |
| 5,907,742 | * 5/1999 | Johnson et al. | 399/51 |

FOREIGN PATENT DOCUMENTS 60-238866 * 11/1985 (JP).
64-002072 * 1/1989 (JP).

* cited by examiner

*Primary Examiner*—Robert Beatty
(74) *Attorney, Agent, or Firm*—Fitzpatrick, Cella, Harper & Scinto

(57) ABSTRACT

In an image forming apparatus having a printing function and a copying function, the copying operation can be performed as fast as possible without increasing the costs. An image forming apparatus in which an original image is read out by an image reader unit and a copy image is outputted from an image forming unit is constructed by: a measuring unit for previously counting a necessary time from the start of activation of a light source of the image reader unit to timing when the light source enters a usable state; and a control unit for controlling in a manner such that in the case where the necessary time counted by the measuring unit is shorter than a predetermined time, the image forming unit is activated when the light source is activated or after the elapse of a specified time, and in the case where the necessary time counted by the measuring unit is longer than the predetermined time, the image forming unit is activated after it was detected that the light source of the image reader unit entered the usable state.

31 Claims, 24 Drawing Sheets

FIG. 5

| NAME OF SIGNAL | ACRONYM | DIRECTION OF SIGNAL |
|---|---|---|
| PRINTER POWER READY | PPRDY | PRINTER CONTROL UNIT ← ENGINE CONTROL UNIT |
| CONTROLLER POWER READY | CPRDY | PRINTER CONTROL UNIT → ENGINE CONTROL UNIT |
| READY | RDY | PRINTER CONTROL UNIT ← ENGINE CONTROL UNIT |
| PRINT | PRNT | PRINTER CONTROL UNIT → ENGINE CONTROL UNIT |
| TOP OF PAGE | TOP | PRINTER CONTROL UNIT ← ENGINE CONTROL UNIT |
| LINE SYNC | LSYNC | PRINTER CONTROL UNIT ← ENGINE CONTROL UNIT |
| VIDEO CLOCK | VCLK | PRINTER CONTROL UNIT → ENGINE CONTROL UNIT |
| VIDEO ENABLE | VDOEN | PRINTER CONTROL UNIT → ENGINE CONTROL UNIT |
| VIDEO | VDO | PRINTER CONTROL UNIT → ENGINE CONTROL UNIT |
| CONTROLLER CLOCK | CCLK | PRINTER CONTROL UNIT → ENGINE CONTROL UNIT |
| COMMAND BUSY | CBSY | PRINTER CONTROL UNIT → ENGINE CONTROL UNIT |
| COMMAND | CMD | PRINTER CONTROL UNIT → ENGINE CONTROL UNIT |
| STATUS BUSY | SBSY | PRINTER CONTROL UNIT ← ENGINE CONTROL UNIT |
| STATUS | STS | PRINTER CONTROL UNIT ← ENGINE CONTROL UNIT |
| PRINTER POWER READY | PFED | PRINTER CONTROL UNIT ← ENGINE CONTROL UNIT |
| SPEED CHANGE | SPCHG | PRINTER CONTROL UNIT → ENGINE CONTROL UNIT |
| PAPER DELIVERY | PDLV | PRINTER CONTROL UNIT ← ENGINE CONTROL UNIT |
| TOP OF PAPER | TOPR | PRINTER CONTROL UNIT ← ENGINE CONTROL UNIT |
| CONDITION CHANGE REPORT | CCRT | PRINTER CONTROL UNIT ← ENGINE CONTROL UNIT |

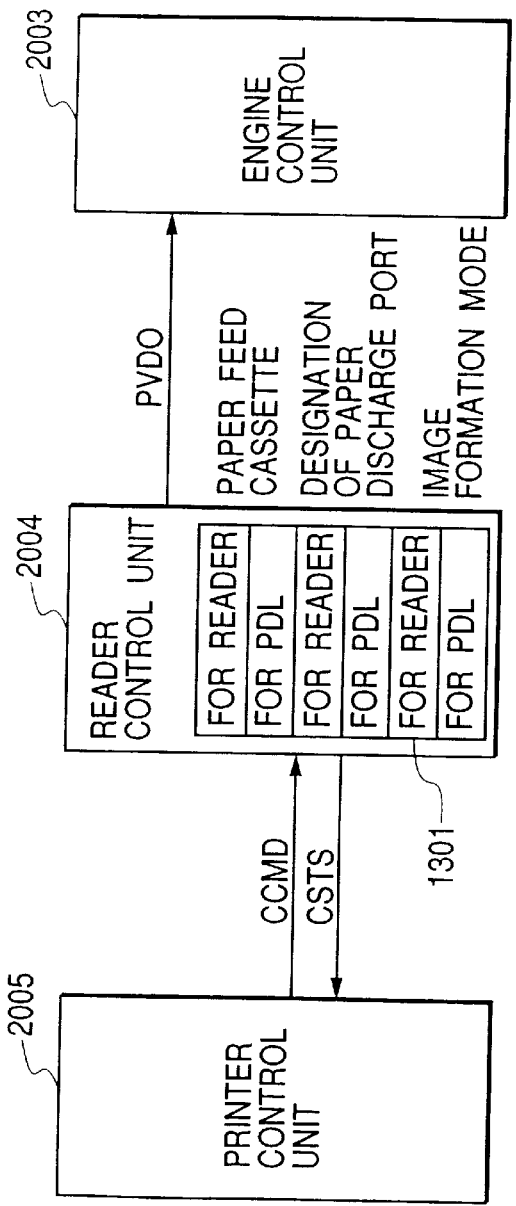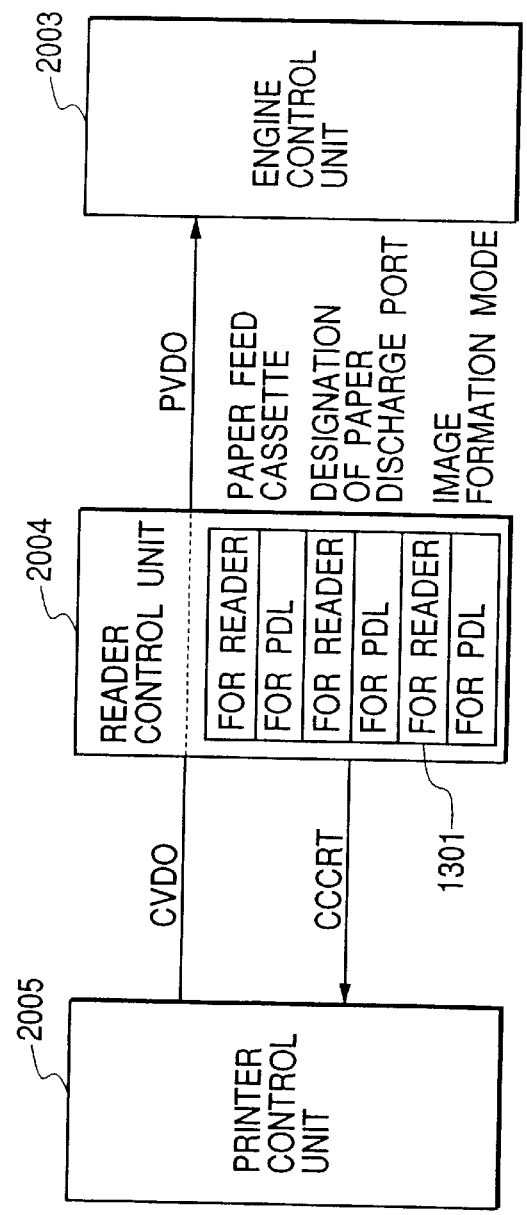

IMAGE FORMING APPARATUS WITH CONTROLLER TO ACTIVATE THE IMAGE FORMING UNIT DEPENDING ON LIGHT SOURCE CYCLE-UP TIME

BACKGROUND OF THE INVENTION

1. Field of the Invention

The invention relates to a lighting control technique of a light source for reading an original in an image forming apparatus having both a copying function and a printing function.

2. Related Background Art

Hitherto, an image forming apparatus with a system construction as shown in FIG. 2 has been known. In the system of FIG. 2, it has a host computer 2103, a printer control unit 2005, and an engine control unit 2003. The host computer 2103 and printer control unit 2005 are directly connected or connected via a network 2105.

The printer control unit 2005 performs a control such that image data of various describing formats such as a PDL (Page Description Language) and the like transmitted from the host computer 2103 is converted into image data of a raster format. The engine control unit 2003 controls a printer engine (not shown) on the basis of the image data transmitted from the printer control unit 2005 via a video interface (I/F) 2104, thereby forming an image onto a recording paper.

As shown in FIG. 27, there has also been realized an image forming system such that by adding an image readout apparatus 101 to the system of FIG. 2 and connecting the image readout apparatus 101 to the host computer 2103 via the network 2105 or directly, image data read out by the image readout apparatus 101 can be printed out by the image forming apparatus.

Further, as shown in FIG. 28, a system such that an image readout apparatus (reader unit) 2601 is directly added to the image forming apparatus and the printing function and the copying function are realized is also known. That is, in the system of FIG. 28, data as a target of printing transmitted from the host computer 2103 is converted into a raster format by a controller unit 2602 and transferred to the engine control unit 2003 via a selector unit 2603, so that it is printed out. Original image data read out by the reader unit 2601 is transferred to the engine control unit 2003 through the selector unit 2603 and is subjected to a copying process. In this instance, the selector unit 2603 controls so as to transfer the data from either the controller unit 2602 or the reader unit 2601 to the engine control unit 2003 in accordance with the printing mode or copying mode.

However, in case of the apparatus having the construction such as to realize both the printing function and the copying function as shown in FIG. 28, a time that is required from the generation of an output request to timing when the image signal is actually outputted in the copying mode is much longer than that in the printing mode. There is also a problem such that if the customer tries to shorten such a delay, the costs rise.

That is, in printing, image data to be transmitted has already been held in a memory of the host computer 2103 or controller unit 2602. Therefore, when an output request is issued, the output operation can be started with only a waiting time until a ready status of the printer engine is guaranteed or, if the printer engine is in an output possible status at a point when the output request is issued, the output operation can be started without a waiting time. On the other hand, in copying such that the reader unit 2601 to read an original synchronously with the printer engine has to be made operative, a waiting time until the ready statuses of both the reader unit 2601 and printer engine 2002 are guaranteed is necessary. That is, in copying, the reader unit 2601 certainly needs a waiting time until an original reading operation is started after the output request was issued. For example, a necessary lighting time of a light source is considered as a factor of the waiting time.

If the necessary lighting time of the light source of the reader unit 2601 is shorter than the waiting time until the printer engine enters the ready status, the waiting time in copying can be made identical to that in printing. However, the necessary lighting time of the light source is generally prolonged in proportion to an accumulated lighting time. Therefore, in copying, a time that is required from the generation of the output request to timing when the image signal is actually outputted is slower than that in printing. To eliminate such a delay, the light source has to be exchanged to a new one before the necessary lighting time of the light source is longer than the necessary time until the printer engine enters a ready status in spite of a fact that there is enough time for the life of the light source. However, such a method results in a remarkable increase in costs.

SUMMARY OF THE INVENTION

The invention is made under such an environment and one of the objects of the invention is that in an image forming apparatus having a copying function, the copying operation can be performed as fast as possible without increasing the costs.

According to the invention, there is provided an image forming apparatus in which an original image is read out by an image reader unit and a copy image is outputted from an image forming unit, comprising: measuring means for previously counting a necessary time from the start of activation of a light source of the image reader unit to timing when the light source enters a usable state; and control means for controlling in a manner such that in the case where the necessary time counted by the measuring means is shorter than a predetermined time, the image forming unit is activated when the light source is activated or after the elapse of a specified time, and in the case where the necessary time counted by the measuring means is longer than the predetermined time, the image forming unit is activated after it was detected that the light source of the image reader unit entered the usable state.

The above and other objects and features of the present invention will become apparent from the following detailed description and the appended claims with reference to the accompanying drawings.

BRIEF DESCRIPTION OF THE DRAWINGS

FIG. 5 is a diagram showing names of the signals (acronyms) in FIG. 4;

FIG. 24 is a diagram for explaining a command holding process for a printing request in the copying operation;

FIG. 25 is a diagram for explaining a command holding process for a copying request in the printing operation;

DETAILED DESCRIPTION OF THE PREFERRED EMBODIMENT

An embodiment of the invention will now be described in detail hereinbelow with reference to the drawings.

Whole Construction

Figure 1:
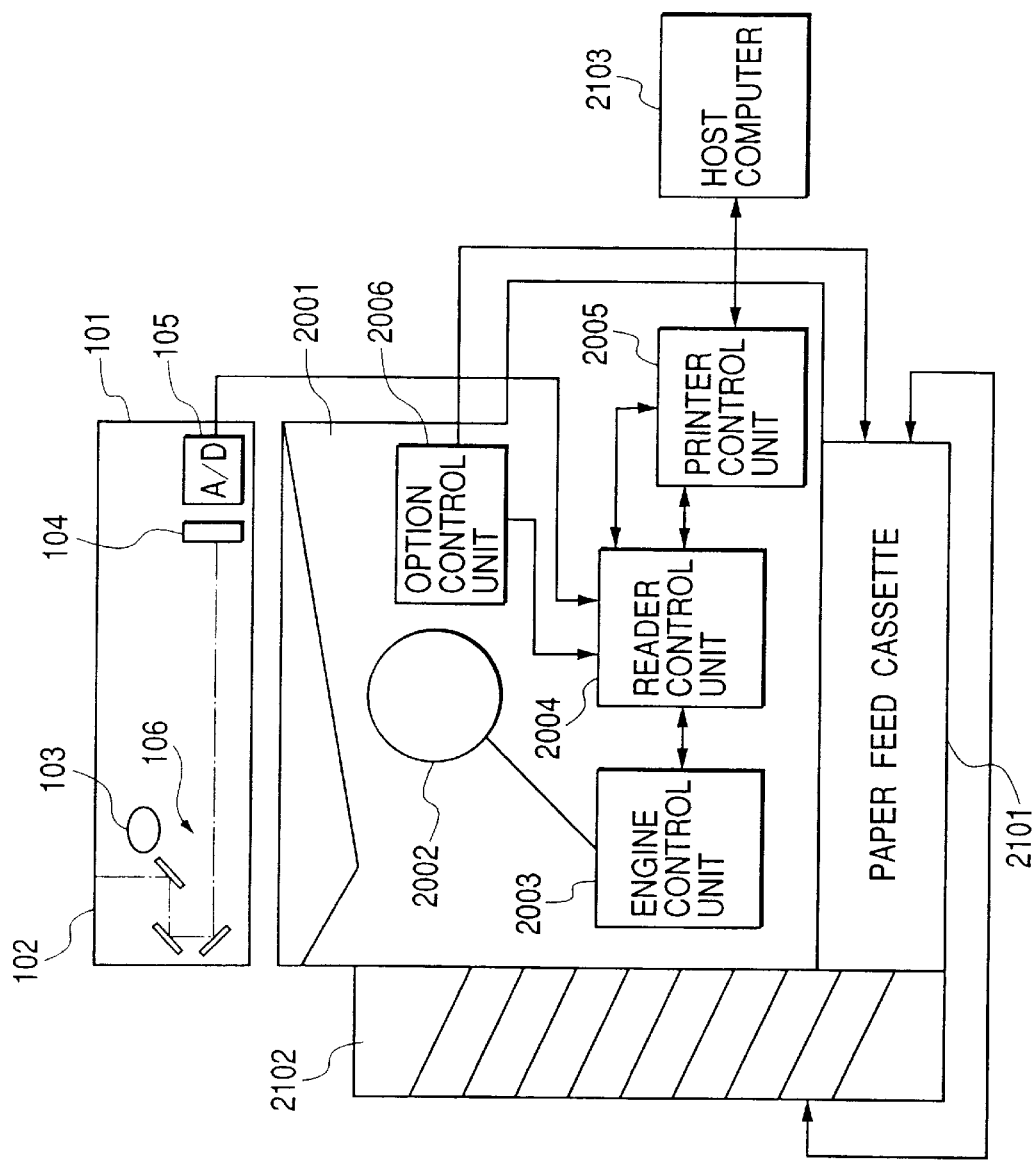
FIG. 1 is a schematic diagram showing a whole construction of a color copying apparatus to which an image forming apparatus according to an embodiment of the invention is applied.

FIG. 1 is a schematic diagram showing a whole construction of a color copying apparatus to which an image forming apparatus according to an embodiment of the invention is applied. In FIG. 1, reference numeral 101 denotes the reader unit. The reader unit 101 has a copyboard 102, a light source 103, a photoelectric converting device 104, an A/D converter 105, and mirrors 106. The light source 103 is constructed by a fluorescent lamp and irradiates light onto an original put on the copyboard 102 while being moved. The reflection light reflected from the original image enters the photoelectric converting device 104 such as CCDs or the like by the mirrors 106. The photoelectric converting device 104 photoelectrically converts the incident light and generates an electric signal as analog image data. The A/D converter 105 converts the analog image data generated from the photoelectric converting device 104 into digital image data.

Reference numeral 2001 denotes a printer unit. The printer unit 2001 has a printer engine 2002, the engine control unit 2003, a reader control unit 2004, the printer control unit 2005, and an option control unit 2006. A paper feed cassette 2101 and a sorter 2102 can be added as options to the printer unit 2001. Further, the printer unit 2001 is connected to the host computer 2103 and can print an image inputted from the host computer 2103.

The printer engine 2002 performs the actual printing operation under control of the engine control unit 2003. The reader control unit 2004 also performs a control of an image signal processing unit 902 (refer to FIG. 9) to perform predetermined processes to the digital image data outputted from the A/D converter 105, a control of a motor driver (not shown) to move the light source 103, and a communication control between the engine control unit 2003 and printer control unit 2005. That is, in the embodiment, by arranging the reader control unit 2004 into the printer unit 2001, an external cable to perform a communication control between the engine control unit 2003 and printer control unit 2005 is made unnecessary.

Fundamental System Construction

In the embodiment, as mentioned above, the reader control unit 2004 is connected between the printer control unit 2005 and engine control unit 2003 and the communication control between the printer control unit 2005 and engine control unit 2003 is processed by the reader control unit 2004. A fundamental system construction as a prerequisite of the above construction will be first described.

Figure 2:
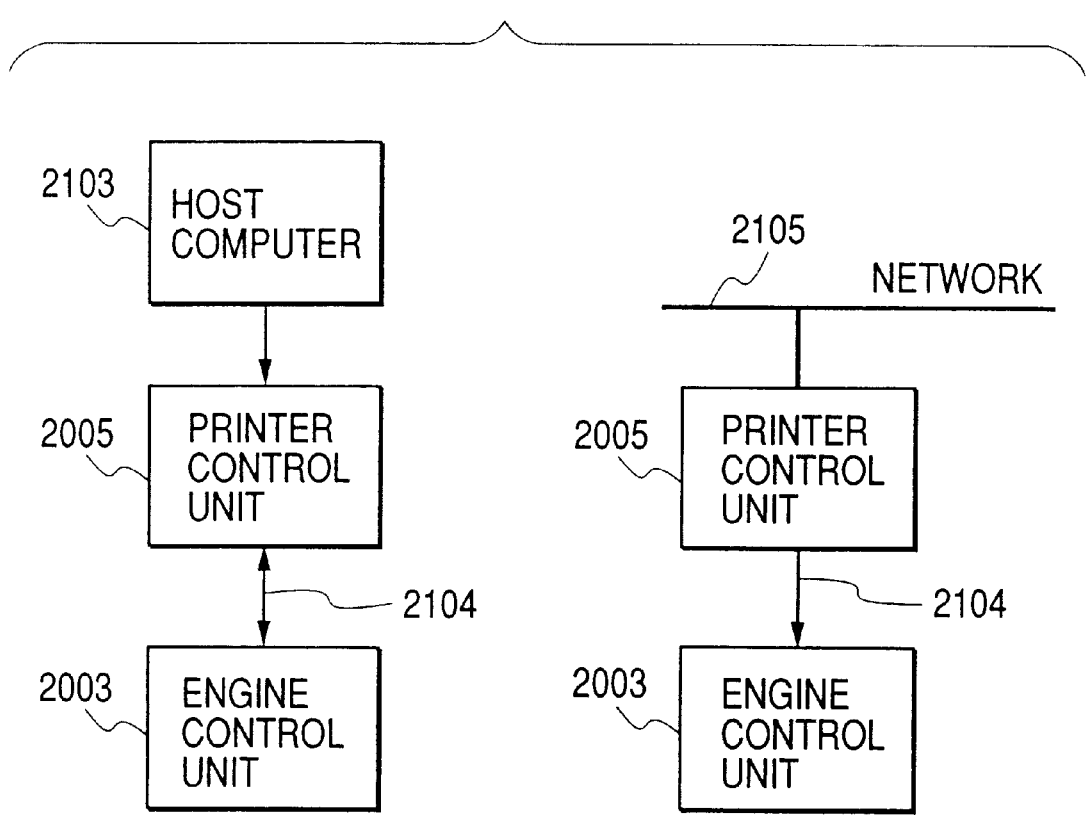
FIG. 2 is a constructional diagram of a fundamental system of a control system in the case where there is no reader control unit.
Figure 3:
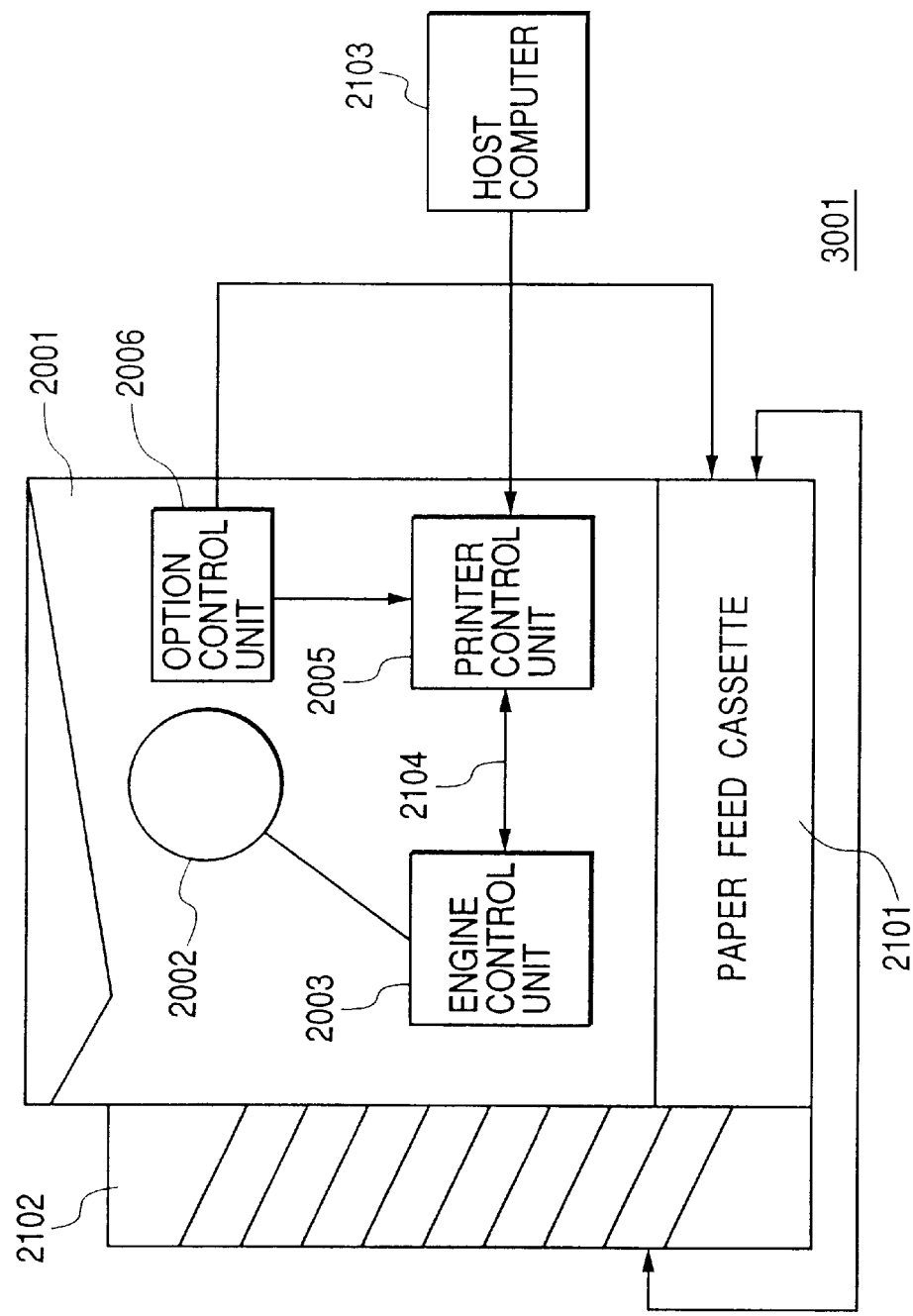
FIG. 3 is a schematic diagram showing a whole construction of a printing apparatus to which the fundamental system of FIG. 2 is applied.

FIG. 2 is a diagram showing a fundamental system construction in the case where the reader control unit 2004 does not exist between the printer control unit 2005 and engine control unit 2003. FIG. 3 is a schematic diagram showing a whole construction of a printing apparatus 3001 to which the fundamental system of FIG. 2 is applied.

Reference numeral 2104 shown in FIGS. 2 and 3 indicates the video I/F for performing a communication between the engine control unit 2003 and printer control unit 2005. The details of the signals which are transmitted and received via the video I/F 2104 will be described hereinlater.

The printer control unit 2005 receives data as a target of printing which is sent from the host computer 2103 directly connected to the printer control unit or from the host computer 2103 via the network 2105. The data is transmitted in various data formats such as bit map data, data described by PDL (Page Description Language), and the like. The printer control unit 2005 develops the reception data as a printing target into a memory as image data of a raster format and transfers it to the engine control unit 2003 through the video I/F 2104.

The engine control unit 2003 forms a toner image on the basis of the received image data, transfers it onto a recording paper, fixes the toner images onto the recording paper, and thereafter, delivers the paper. The details of the image forming process in the engine control unit 2003 will be described hereinlater. To realize the image forming sequence, the engine control unit 2003 controls various loads, detects a status of the printer engine 2002, and notifies the printer control unit 2005 of the status. In this manner, the data formed by the host computer 2103 can be printed out.

Figure 4:
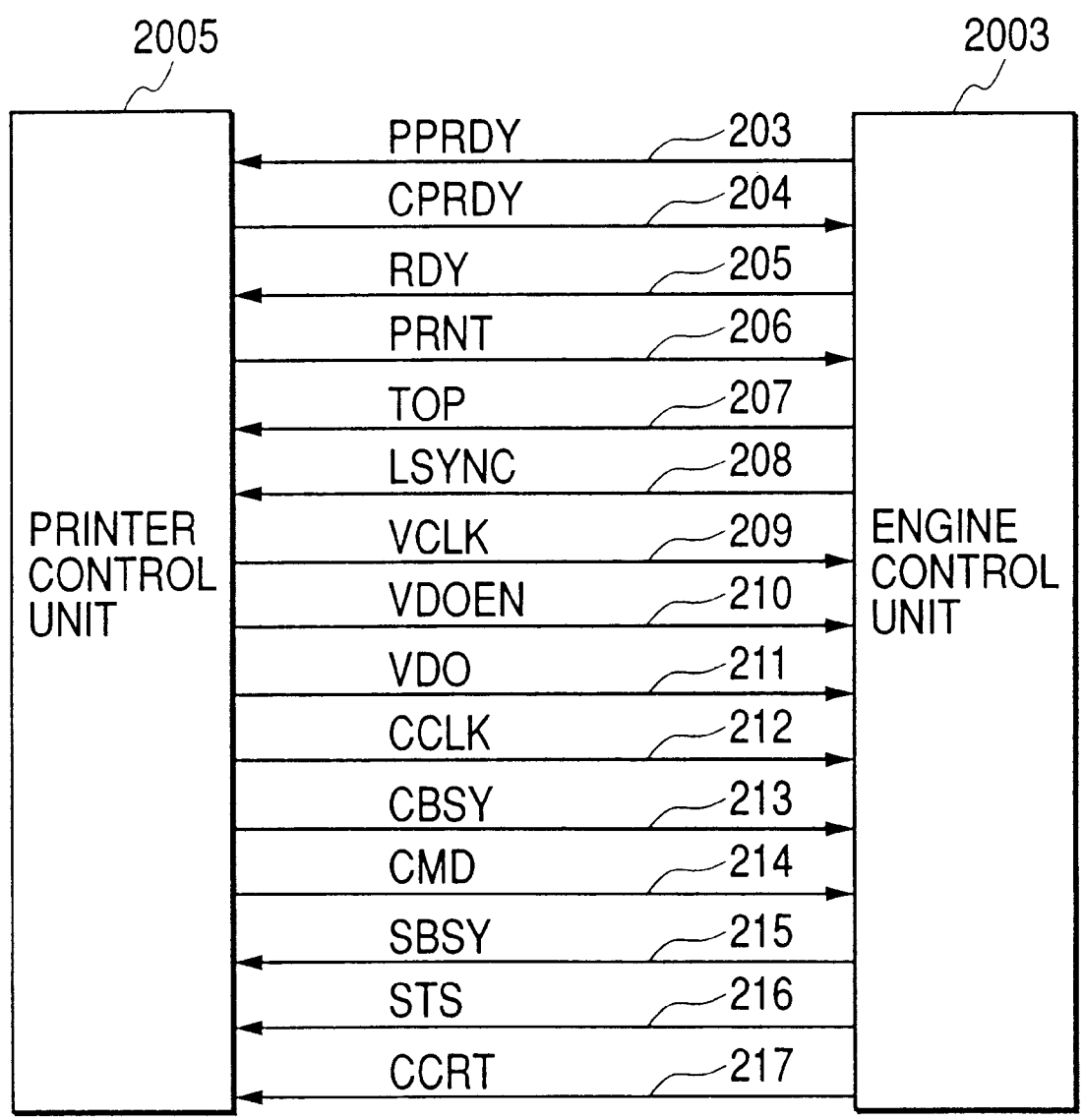
FIG. 4 is a diagram showing signals which are transmitted and received between a printer control unit and an engine control unit in FIGS. 2 and 3.

Signals which are transmitted and received between the printer control unit 2005 and engine control unit 2003 under the fundamental system construction shown in FIG. 2 will now be described in detail with reference to FIGS. 4 and 5. Although various signals as shown in FIG. 5 are transmitted and received between the printer control unit 2005 and engine control unit 2003, only the typical signals shown in FIG. 4 will now be particularly described.

First, a PPRDY (printer power ready) signal 203 is a signal showing that a communication with the printer control unit 2005 can be performed after a power source was supplied to the engine control unit 2003 and processes such as an initial setting and the like were finished. A CPRDY (controller power ready) signal 204 is a signal showing that a communication with the engine control unit 2003 can be performed after a power source was supplied to the printer control unit 2005 and processes such as an initial setting and the like were finished.

An RDY (ready) signal 205 is a signal showing that the printing operation can be performed. In response to a printing start instruction signal [PRNT (printing) signal] 206 from the printer control unit 2005, the engine control unit 2003 outputs the RDY signal 205 to the printer control unit 2005. The RDY signal 205 is set to "true" in the case where each portion of the printer engine 2002 normally operates in a state such that a temperature in a fixing device in the printer engine 2002 reaches a predetermined temperature, no recording paper remains in the printer, a polygon mirror is rotating at a predetermined speed, or the like. The PRNT signal 206 also instructs the continuation of the printing operation besides the start of the printing operation.

A TOP (top of page) signal 207 is a sync signal serving as a reference of the vertical scan of the image and is generated from the engine control unit 2003 to the printer control unit 2005. The TOP signal 207 is outputted after the elapse of a predetermined time after the PRNT signal 206 was generated from the printer control unit 2005. An LSYNC (line sync) signal 208 is a sync signal which is used as a reference of the horizontal scan by the printer control unit 2005. In a manner similar to the TOP signal 207, the LSYNC signal 208 is generated after the elapse of a predetermined time after the PRNT signal 206 was outputted from the printer control unit 2005.

A VCLK (video clock) signal 209 is a sync clock signal for a VDOEN (video enable) signal 210 and a VDO (video) signal 211, which will be explained hereinlater, and has a frequency corresponding to the image signal. The VDOEN signal 210 is a signal to perform a fetching control when the image signal outputted from the printer control unit 2005 is fetched by the engine control unit 2003. The engine control unit 2003 detects whether the VDOEN signal 210 is "true" or "false" synchronously with the VCLK signal 209. The image signal is fetched when the VDOEN signal 210 is "true". The image signal is not fetched when it is "false". The VDO signal 211 indicates the image data. The printer control unit 2005 generates the VDO signal 211 synchronously with the VCLK signal 209 while using the TOP signal 207 as a reference for the vertical direction and the LSYNC signal 208 as a reference for the horizontal direction.

A CCLK (controller clock) signal 212 is a sync clock signal when the printer control unit 2005 transmits a serial command to the engine control unit 2003 and when the engine control unit 2003 transmits a serial status signal to the printer control unit 2005 in response to the serial command. The CCLK signal 212 is generated from the printer control unit 2005. A CBSY (command busy) signal 213 is a signal to notify the engine control unit 2003 of a fact that the printer control unit 2005 is transmitting the serial command by using a CMD (command) signal 214, which will be explained hereinlater. The CMD signal 214 is a signal which is used when the printer control unit 2005 transmits the serial command to the engine control unit 2003.

An SBSY (status busy) signal 215 is a signal to notify the printer control unit 2005 of a fact that the engine control unit 2003 is returning a serial status signal by using an STS (status) signal 216, which will be explained hereinlater. The STS signal 216 is a signal which is used when the engine control unit 2003 returns the serial status signal to the printer control unit 2005. A CCRT (condition change report) signal 217 is a signal to report a status change to the printer control unit 2005 when the status of the printer engine 2002 changes. When the CCRT signal 217 is received, the printer control unit 2005 issues a command to inquire which status of the printer engine 2002 changed by using the CMD signal 214. In response to this inquiry command, the engine control unit 2003 replies by using the STS signal 216.

There is also a case where each of the above signals is called a signal line in the following description.

A mechanical whole construction of the printer engine 2002 which is controlled by the engine control unit 2003 will now be described with reference to FIG. 6.

Figure 6:
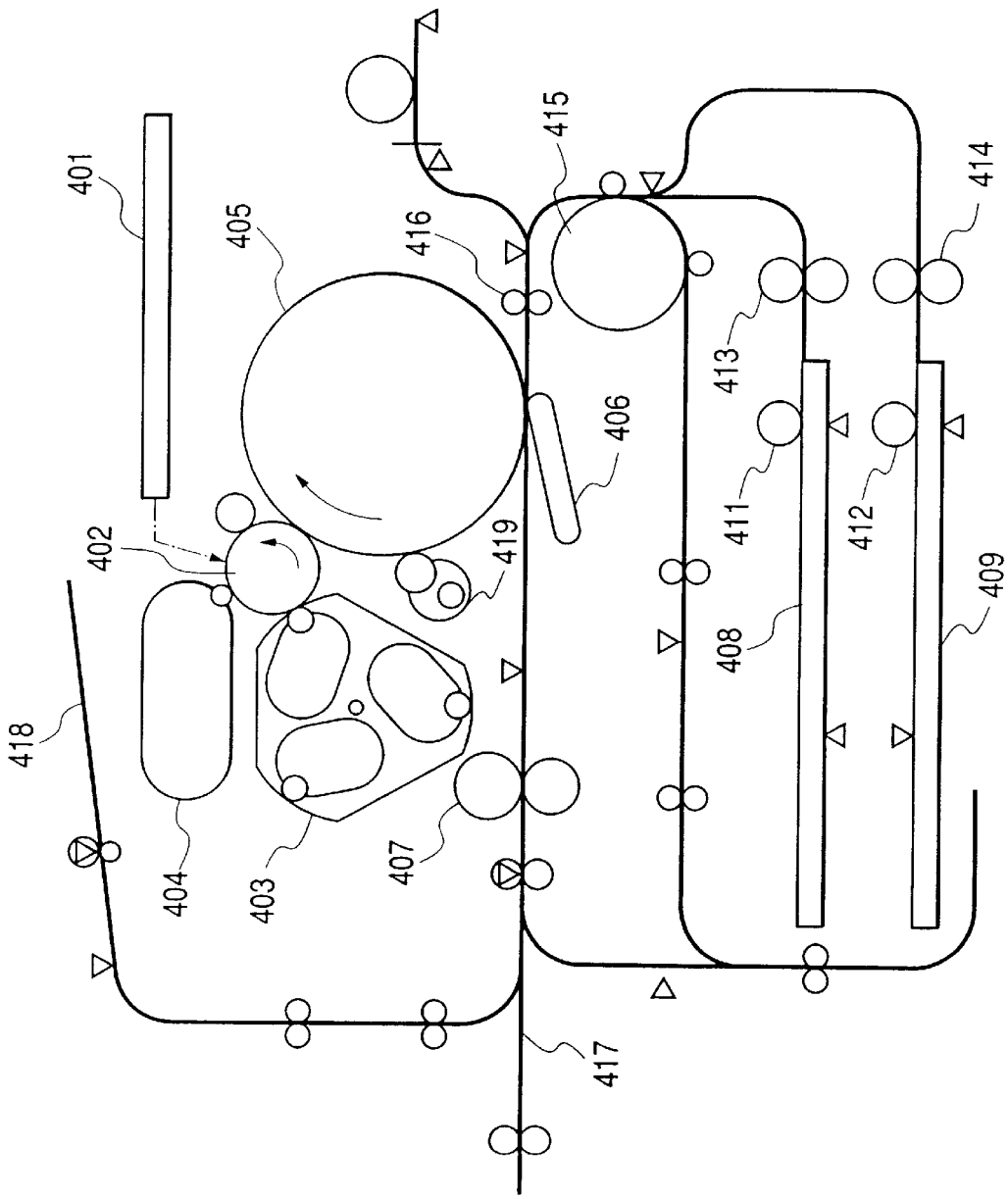
FIG. 6 is a schematic diagram showing a whole mechanical construction of a printer engine.

In FIG. 6, a photosensitive scanner 401 generates a laser beam according to the video signal (VDO signal 211) sent from the printer control unit 2005 through the engine control unit 2003 and irradiates it onto a photosensitive drum 402 via the polygon mirror (not shown), thereby forming an electrostatic latent image onto the photosensitive drum 402. The photosensitive drum 402 sequentially allows an electrostatic latent image to face a color developer 403 and a black developer while rotating counterclockwise. The color developer 403 and black developer 404 deposits toner onto the surface of the photosensitive drum 402 in accordance with the electrostatic latent image formed on the photosensitive drum 402, thereby developing the electrostatic latent image. In case of a black and white image, only the black developer 404 operates. In case of a color image, both the color developer 403 and black developer 404 operate.

The toner image formed on the photosensitive drum 402 is transferred onto an intermediate transfer material 405 which is rotating clockwise. In case of a black and white image, the intermediate transfer material 405 rotates once and, in case of a color image, the intermediate transfer material 405 rotates four times, thereby completing an intermediate transfer of once. In parallel with such an operation, the recording paper picked up and conveyed from an upper paper feed cassette 408 or a lower paper feed cassette 409 by a pickup roller 411 or 412 is fed by a paper feed roller 413 or 414 and conveyed to a resist roller 416 by a conveying roller 415.

At timing of the end of transfer on the intermediate transfer material 405, the resist roller 416 sends the recording paper to a portion between the intermediate transfer material 405 and a transfer belt 406. Thus, the transfer belt 406 elevates so as to be come into contact with the intermediate transfer material 405 at a point when the recording paper reaches. The toner image on the intermediate transfer material 405 is transferred onto the recording paper. The image transferred to the recording paper is fixed to the recording paper by a heating process and a pressurizing process by a fixing roller 407. The recording paper on which the image has been fixed is ejected from either a face-up paper discharge port 417 or a face-down paper discharge port 418 which has previously been designated by the printer control unit 2205.

Figure 7:
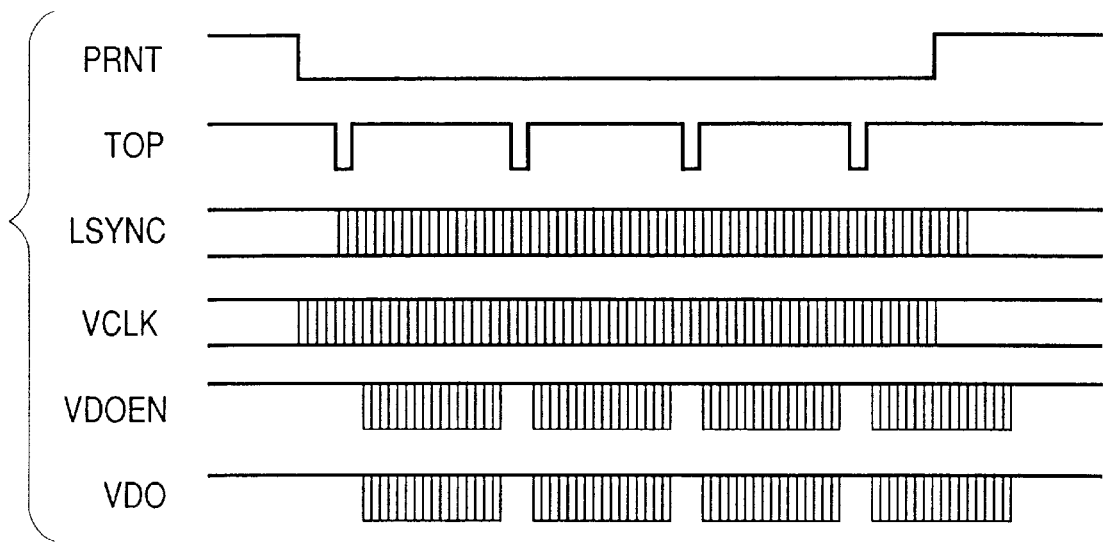
FIG. 7 is a time chart for explaining timings for transmission and reception of a video signal.

Timings of the signals which are transmitted and received between the printer control unit 2005 and engine control unit 2003 will now be described with reference to a timing chart of FIG. 7. The timing chart shows the foregoing various signals in accordance with the elapse of time.

First, when the preparation of image information is completed, the printer control unit 2005 sets the PRNT signal to the low level (true) and transfers it to the engine control unit 2003. At the same time, the image sync signal (VCLK signal) for use in transfer of the video signal is also generated. In response to it, the engine control unit 2003 performs various settings and the like in the printer engine 2002. When the image can be received, the engine control unit generates the TOP signal and LSYNC signal to the printer control unit 2005. In response to the vertical sync signal (TOP signal) and the horizontal sync signal (LSYNC), the printer control unit 2005 transfers the video signal (VDO signal) and the VDOEN signal as a video enable signal to the engine control unit 2003.

Figure 8:
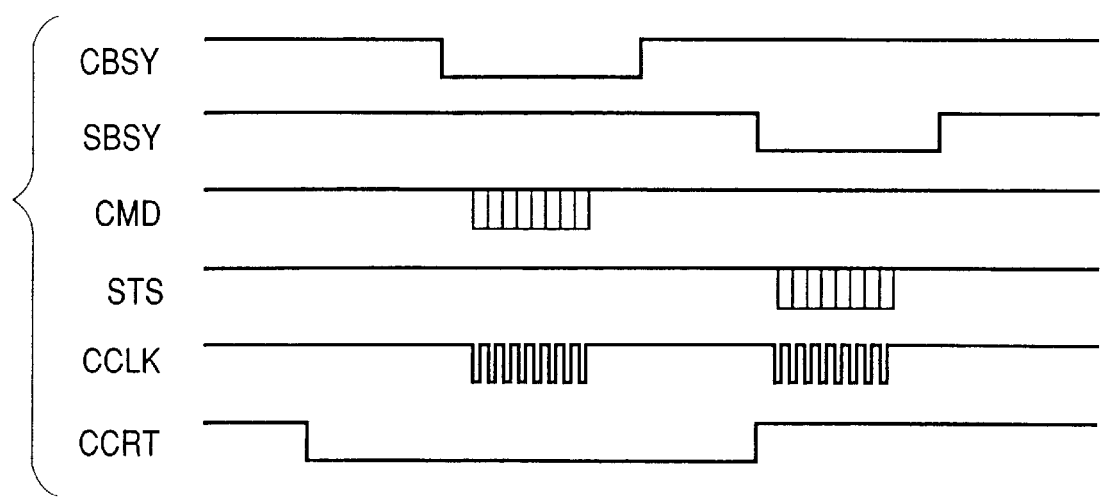
FIG. 8 is a time chart showing the signal transmission and reception during the printing operation.

Which command and status are transmitted and received during the printing operation by the serial communication will now be described. FIG. 8 shows timings for the serial communication between the printer control unit 2005 and engine control unit 2003.

First, a case where the CCRT signal at the bottom stage in FIG. 8 is not used will now be described. When the printer control unit 2005 wants to issue a command to the engine control unit 2003, the CBSY signal is set to the low level (true) and transferred as a CMD signal synchronously with the clock signal (CCLK signal). The engine control unit 2003 which received those signals confirms that the CBSY signal is at the high level (false). After that, the SBSY signal is set to the low level (true) and the status data on the printer engine 2002 side corresponding to the command is sent as an STS signal synchronously with the CCLK signal generated from the printer control unit 2005. The printer control unit 2005 continues or interrupts the print control on the basis of the received status data.

The CCRT signal will now be described. The CCRT signal is a signal which is set to the low level (true) when a change occurs for the status on the printer engine 2002 side which has previously been designated by the printer control unit 2005. For example, it is now assumed that the printer control unit 2005 has preset by the CMD signal so as to validate the CCRT signal when the absence of the recording paper occurs. In this case, now assuming that the printer control unit 2005 requests the print-out of two sheets of papers in a state where only one recording paper remains, the print sequence operation of the first sheet is normally processed without any problem. However, since the second recording paper does not exist, at the stage of the start of the image forming process for the second sheet, the engine control unit 2003 side detects the status change and changes the CCRT signal from the high level (false) to the low level (true).

When it is detected that the CCRT signal changes to the low level (true), the printer control unit 2005 issues a command to request a recording paper presence/absence status to the engine control unit 2003 in order to know which paper feed cassette is in a state of no recording paper. In response to the request command, the engine control unit 2003 returns the status of the no-paper feed cassette to the printer control unit 2005. The CCRT signal is cleared to the high level at timing when the SBSY signal in which the status is returned is set to the low level.

Figure 9:
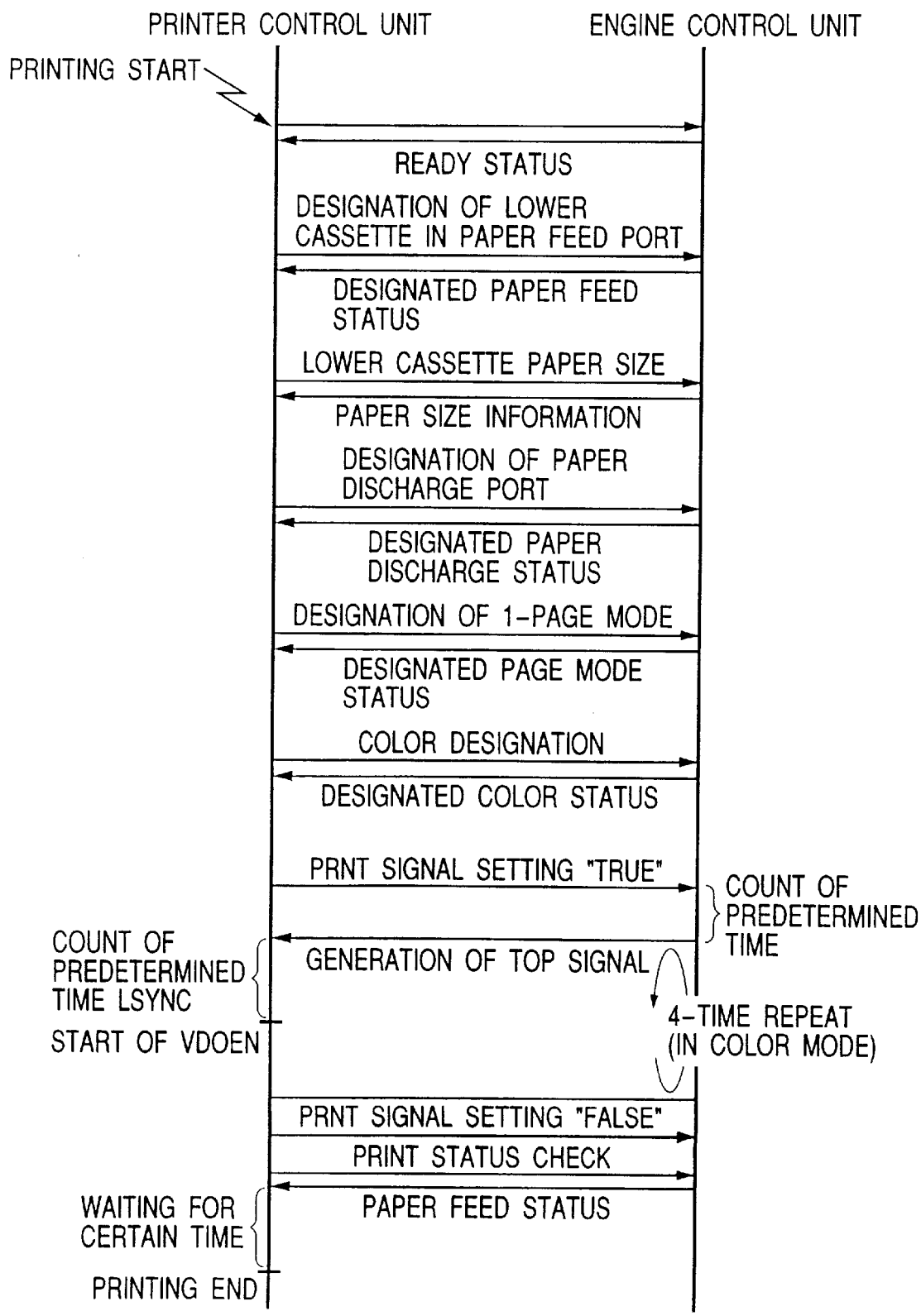
FIG. 9 is a sequence diagram showing a flow of signals which are transmitted and received between the printer control unit and the engine control unit in the printing operation.

A flow of transmission and reception of the command/ status which are actually performed between the printer control unit 2005 and engine control unit 2003 at the time of the printing operation will subsequently be described with reference to a sequence diagram of FIG. 9. A color output is assumed here.

When a printing start request is generated, the printer control unit 2005 inquires of the engine control unit 2003 about the ready status of the printer engine 2002 while performing the converting process or the like of the image data. Subsequently, a command to designate the recording paper feed cassette is issued. Further, a command to request size information of the recording paper enclosed in the designated recording paper feed cassette is issued. In response to those series of commands, the engine control unit 2003 returns the corresponding status.

Subsequently, the printer control unit 2005 sequentially issues a command to designate a paper discharge port and a page mode designation command to designate how many pages (how many copies) the same image is printed. Finally, by issuing a command to designate monochromatic/color, all of the setting operations to the engine control unit 2003 are finished. After that, a printing request signal (PRNT signal 206) is issued to the engine control unit 2003. In response to it, the TOP signal 207 and LSYNC signal 208 are returned from the engine control unit 2003 only for a predetermined time.

The printer control unit 2005 transfers the VDO signal 211 to the engine control unit 2003 in accordance with the VCLK signal 209 synchronously with the TOP signal 207 for the vertical scanning direction and synchronously with the LSYNC signal 208 for the horizontal scanning direction. Since the printer is set to the color mode here, the TOP signal 207 is generated four times. Toner images of four colors of C (cyan), M (magenta), Y (yellow), and K (black) are formed. After the fourth TOP signal 207 was received, the printer control unit 2005 returns the PRNT signal 206 to the high level (false). Thus, the engine control unit 2003 recognizes that the printing process regarding the printing request, namely, one print job has been finished, and a post process such as a cleaning process of the intermediate transfer material 405 or the like is executed.

After the recording paper on which the image had been transferred passed through the fixing roller 407, it is ejected from the designated paper discharge port. The printer control unit 2005 transmits a print status check signal to the engine control unit 2003, confirms that the status is not a recording paper conveying status, namely, the paper ejection was finished, and waits in the ready status until a next print request is generated.

When an illegal status such as jam of the recording paper, absence of recording paper, door-open by the user, or the like occurs during the operation as mentioned above, the engine control unit 2003 immediately notifies the printer control unit 2005 of an abnormality of the apparatus by using the CCRT signal 217. The printer control unit 2005 executes a predetermined corresponding process according to the abnormal status of the apparatus.

Construction When the Reader control Unit is Attached

Figure 10:
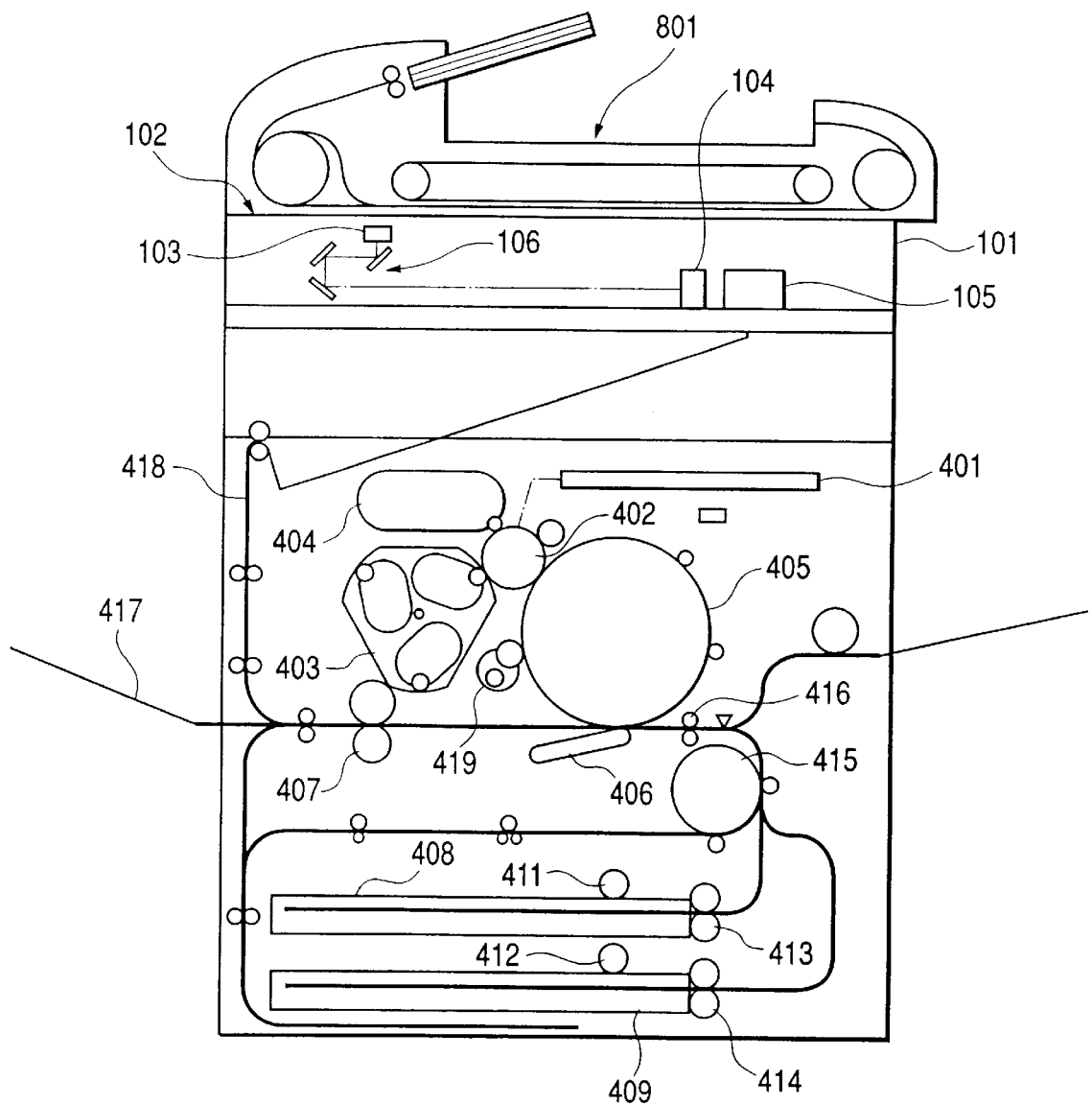
FIG. 10 is a schematic diagram showing a whole mechanical construction of a digital copying machine.

FIG. 10 is a schematic diagram showing a whole mechanical construction of a digital copying machine in which a copying function for not only printing data transferred from the host computer but also optically reading an image on the original and printing is added to the printing apparatus described above.

In FIG. 10, reference numeral 801 denotes an original feeding apparatus for feeding an original onto the copyboard 102. The conveyance of the original by the original feeding apparatus 801 is performed synchronously with the original reading operation by the image readout apparatus (reader unit) 101. That is, when the original is conveyed onto the copyboard 102 by the original feeding apparatus 801, in the reader unit 101, the original image is scanned while moving the light source (fluorescent lamp) 103 or the like to the right and left in FIG. 10. The reflection light subjected to a predetermined optical process is inputted to the photoelectric converting device 104. The analog image data which was photoelectrically converted by the photoelectric converting device 104 and outputted is converted into the digital image data by the A/D converter 105 and transferred to the photosensitive scanner 401. The image forming process as described by using FIG. 6 is executed.

Figure 11:
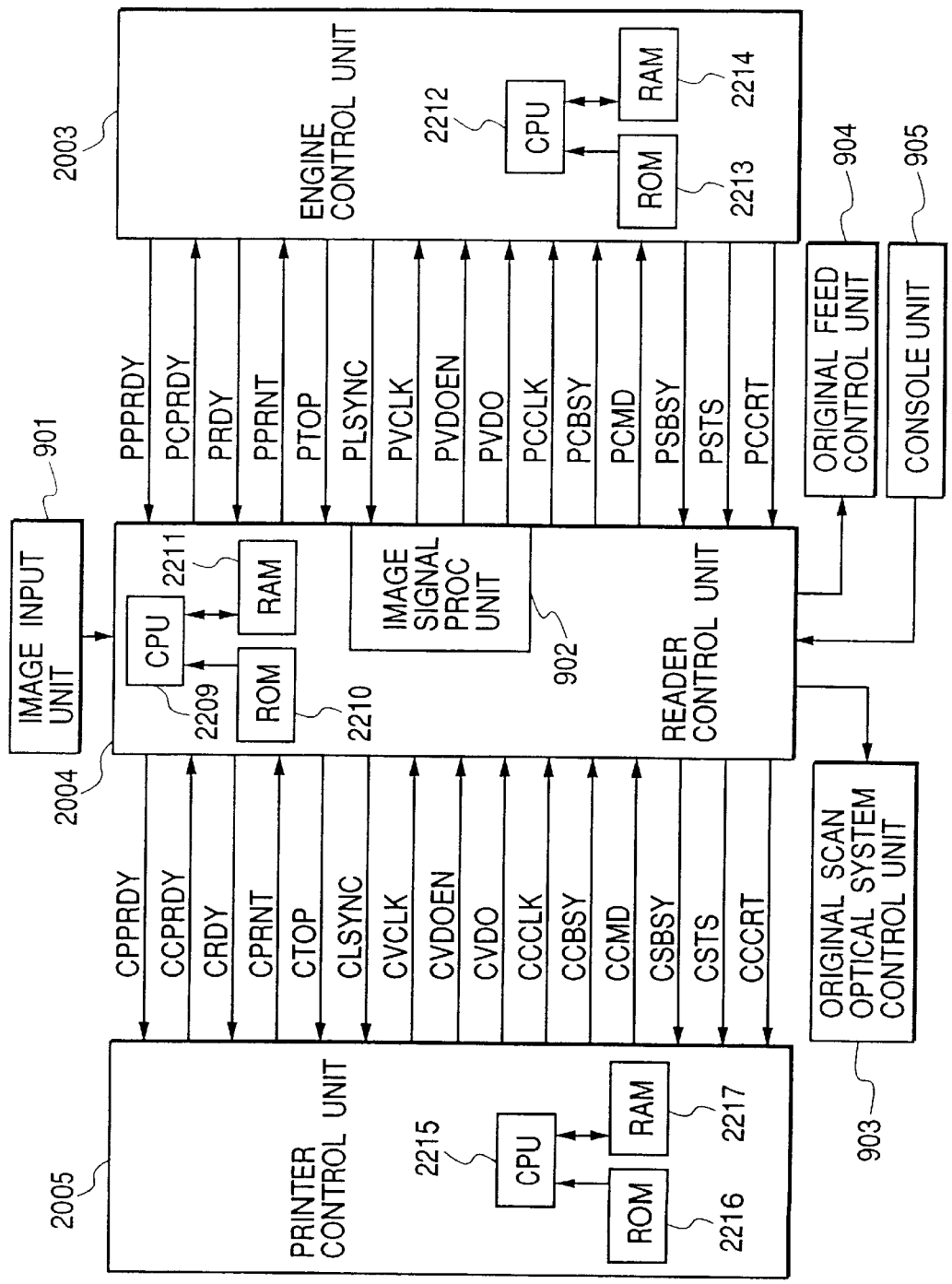
FIG. 11 is a constructional diagram of a fundamental system of a control system in the case where a reader control unit is added.

FIG. 11 is a schematic diagram showing a whole construction of the control system in the case where the reader control unit 2004 is added. As shown in FIG. 11, the reader control unit 2004 is arranged between the printer control unit 2005 and engine control unit 2003 in FIG. 2. The kinds of signals which are transmitted and received between the printer control unit 2005 and reader control unit 2004 and between the engine control unit 2003 and reader control unit 2004 are almost the same as those of the signals shown in FIGS. 4 and 5. However, although the signals between the printer control unit 2005 and reader control unit 2004 and the signals between the engine control unit 2003 and reader control unit 2004 are the signals having the same functions, they are physically different. Therefore, "C" is added to each of the former signals as a signal name and "P" is added to each of the latter signals as a signal name, thereby distinguishing those signals.

Reference numeral 901 denotes an image input unit for inputting the original image data outputted from the reader unit 101 to the image signal processing unit 902 in the reader control unit 2004. The image signal processing unit 902 converts the image data read out by the reader unit into the data of the raster format so that it can be printed. Reference numeral 903 denotes an original scan optical system control unit for controlling the reader unit 101; 904 an original feed control unit to control the original feeding apparatus 801; and 905 a console unit to set a post process delay mode, a monochromatic/color printing mode, quantity of prints, and the like, which will be explained hereinlater.

The engine control unit 2003, reader control unit 2004, and printer control unit 2005 have ROMs 2213, 2210, and 2216 in which control programs to execute the processes as mentioned above have been stored, CPUs 2212, 2209, and 2215 to execute the control programs, and RAMs 2214, 2211, and 2217 which are used as work areas or the like.

Figure 12:
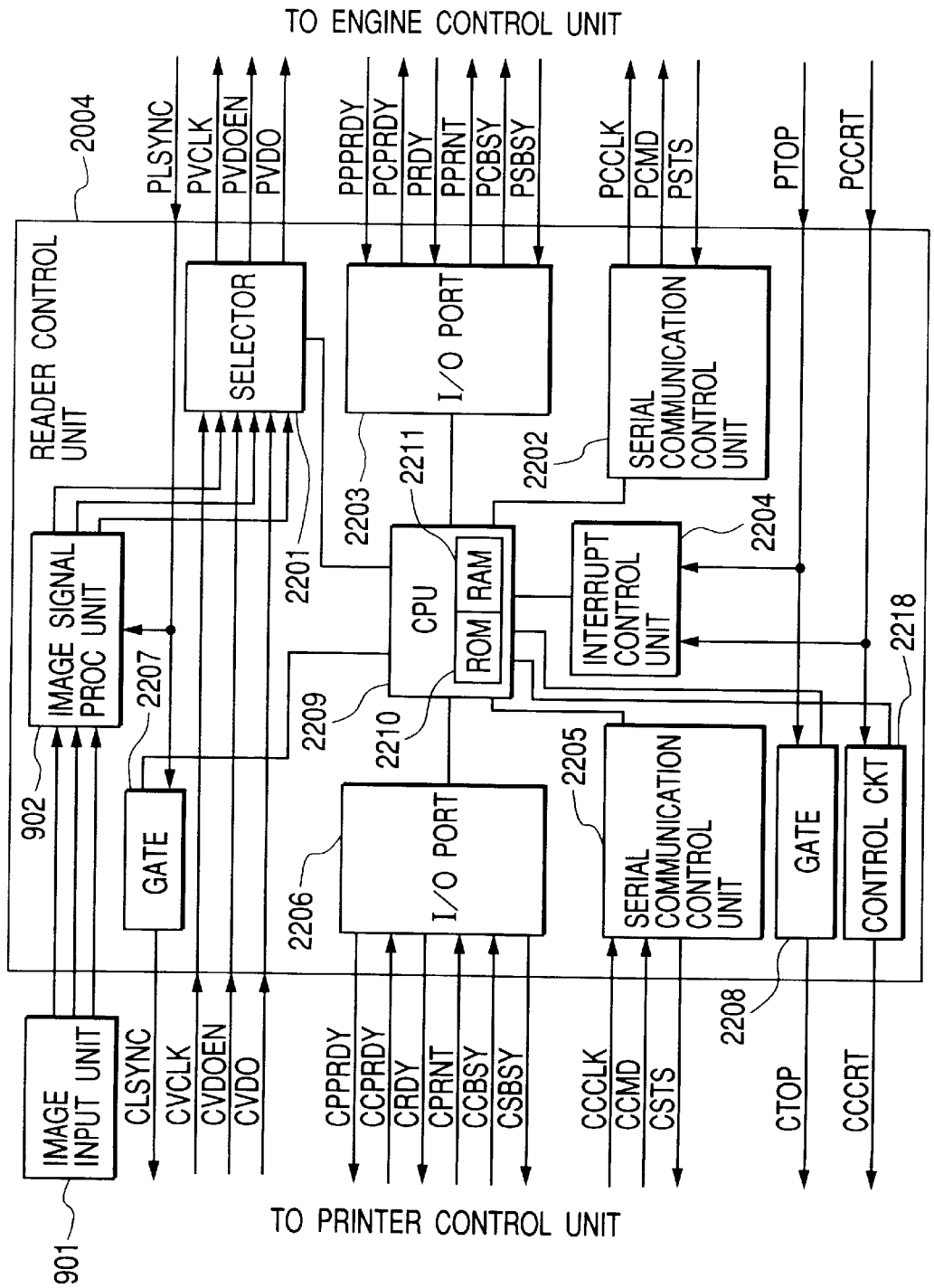
FIG. 12 is a block diagram showing a detailed construction of the reader control unit.

FIG. 12 is a block diagram showing a detailed construction of the reader control unit 2004. In FIG. 12, reference numeral 2201 denotes a selector to select either the image data from the image signal processing unit 902 (namely, reader unit 101) or the image signal from the printer control unit 2005 (namely, host computer 2103) and output the selected image data or image signal to the engine control unit 2003. As signal systems which are switched by the selector 2201, there are three systems of the video clock signal (VCLK signal 209), video enable signal (VDOEN signal 210), and video data (VDO signal 211).

Reference numeral 2202 denotes a serial communication control unit to communicate with the engine control unit 2003; 2203 an input/output port to transmit and receive signals to compensate the communication in the serial communication control unit 2202; and 2204 an interrupt control unit. An image top requesting signal (PTOP signal 207) and a printer condition change signal (PCCRT signal 217) are inputted to the interrupt control unit 2204. Reference numeral 2205 denotes a serial communication control unit to communicate with the printer control unit 2005 and 2206 an input/output port to transmit and receive signals to compensate the communication in the serial communication control unit 2205.

Reference numerals 2207 and 2208 denote gates for controlling whether the signal sent from the engine control unit 2003 is transmitted to the printer control unit 2005 or not. The line sync signal (PLSYNC signal 208) is controlled in the gate 2207. The image top requesting signal (PTOP signal 207) is controlled in the gate 2208. Reference numeral 2218 denotes a control circuit having a gate function and a flag setting function. The control circuit 2218 controls the printer condition change signal (PCCRT signal 217). That is, the control circuit 2218 controls whether the printer condition change signal (PCCRT signal 217) issued from the engine control unit 2003 is transferred to the printer control unit 2005 or not by the opening/closing operations of the gates. By setting the flag, the printer condition change signal (PCCRT signal 217) can be issued from the reader control unit 2004 to the printer control unit 2005. Reference numeral 2209 denotes the CPU to control the whole operation of the reader control unit 2004. The CPU 2209 includes: the ROM 2210 in which control programs to perform various processes such as a lighting control of the light source (fluorescent lamp) 103, which will be explained hereinlater, and the like have been stored; and the RAM 2211 which is used as a work area or the like.

Lighting Control of Light source

Figure 13:
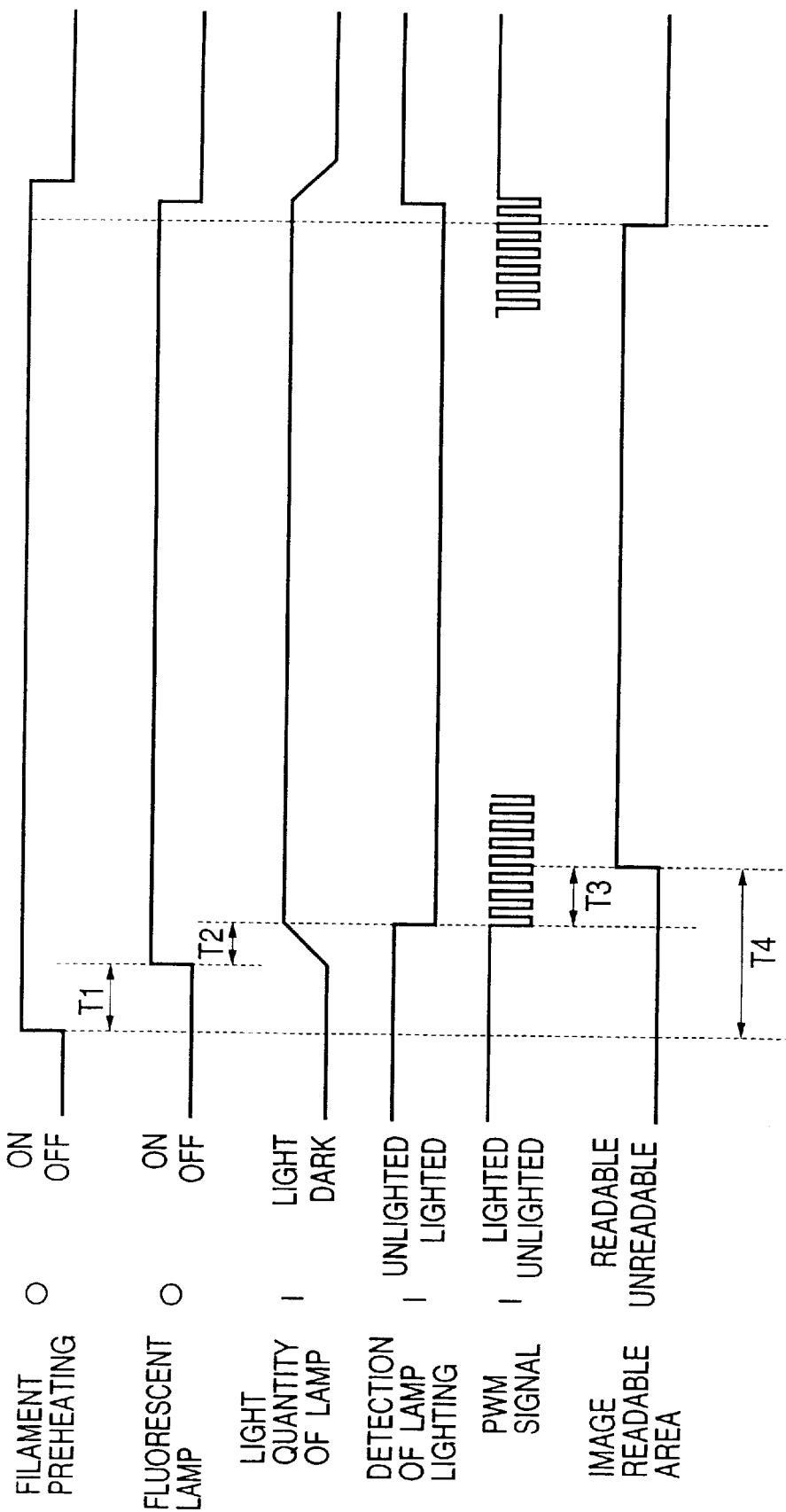
FIG. 13 is a timing chart for a fluorescent lamp lighting control signal.

The case where the light source 103 is a fluorescent lamp will now be described with respect to its lighting control. FIG. 13 is a timing chart of a fluorescent lamp lighting control signal. To prevent blackening of the fluorescent lamp 103, a filament has to be preheated to a predetermined temperature before the lamp is lit on. For this purpose, after a filament preheating signal was first turned on, the apparatus waits until the filament reaches the predetermined temperature (this waiting time is labelled to T1) and, thereafter, a fluorescent lamp lighting signal is turned on. At this time, to minimize the time that is required until a light quantity of the lamp reaches a desired value, a duty ratio of a current supplying time of a lamp current is set to 100%.

A time which is required from the turn-on of the fluorescent lamp lighting signal to the timing when the light quantity of the lamp reaches the desired value is labelled to T2. A fact that the lamp light quantity has reached the desired value is detected by a light adjusting sensor, the duty ratio of the current supplying time of the lamp current is changed to about 40% of the ordinary value, and a PWM light adjustment control by an inverter is started. After the duty ratio was changed, a time which is required until the lamp light quantity is settled and the image can be read out is set to T3. That is, as a time which is required from the start of the lamp lighting control to the timing when the fluorescent lamp 103 is actually lit on by a desired stable light quantity and the image can be read out (this time is labelled to T4), the time T4 (=T1+T2+T3) is required. Although T1 of a few seconds and T3 of about 0.5 second are necessary, T2 is prolonged in accordance with the accumulated lighting time of the fluorescent lamp 103 and a time within a range from about 0.5 second to a few seconds is necessary.

Operation in Copying

The operation when a full color original image is read out and copied will now be described. When a copy start key 2703 (not shown) on the console unit 905 is depressed, the reader control unit 2004 closes the gates 2207 and 2208 and the gate of the control circuit 2218 since the operating mode is the copying mode, and sets the selector 2201 so as to select an output of the image signal processing unit 902. Subsequently, the ready status signal (PRDY signal 203) of the printer engine 2002 is checked for the engine control unit 2003 by using the I/O port 2203.

Various items are set by using the serial communication control unit 2202. That is, a command to designate the paper feed cassette (cassette 408 or 409) of the recording papers is issued. Further, a command to request the size of recording papers enclosed in the designated cassette is issued. In response to those commands, the engine control unit 2003 returns the corresponding status signals. Subsequently, a command to designate a paper discharge port is issued to thereby decide the paper discharge port. A quantity (page mode) designating command to designate how many sheets are copied each time from one original image is issued. Finally, all of the settings for the engine control unit 2003 are finished by issuing a command to designate either monochromatic or color.

After the original was fed onto the copyboard 102 by the original feeding apparatus 801, the reader control unit 2004 generates the printing request signal (PPRNT signal 206) to the engine control unit 2003. In response to it, when the PTOP signal 207 is returned from the engine control unit 2003 after the elapse of a predetermined time, the reader control unit 2004 allows the PTOP signal 207 to be processed by the interrupt control unit 2204 and makes the reader unit 101 operative so as to be synchronized with the PTOP signal 207. That is, the vertical scanning direction is synchronized with the PTOP signal 207 and the horizontal scanning direction is synchronized with the PLSYNC signal 208. The PVDO signal 211 is inputted from the photoelectric converting device 104 to the image signal processing unit 902 synchronously with the PVCLK signal 209. The image data processed in the image signal processing unit 902 is transferred to the engine control unit 2003.

Since the operating mode is set to the color mode, the optical scanning system is operated four times and images as many as four colors of CMYK are formed in response to the PTOP signal 207 which is generated four times. After the final PTOP signal corresponding to the designated quantity was generated, the PPRNT signal 206 is returned to the high level (false). Thus, the engine control unit 2003 recognizes that the printing regarding the printing request has been finished, and shifts to a post process such as a cleaning operation or the like of the intermediate transfer material 405. After the recording paper to which the image had been transferred passed through the fixing roller 407, it is ejected to the designated paper discharge port. Finally, after confirming that the printer is not in the recording paper conveying state (end of paper delivery), the reader control unit 2004 waits in the ready status until a next printing request is generated to the engine control unit 2003.

Operation in Printing

The operation in the case where the image from the printer control unit 2005 (namely, from the host computer 2103) is printed out will now be described. At the stage of the end of the copying operation, the reader control unit 2004 enters the ready status. In this instance, for the operation in printing, the reader control unit 2004 opens the gates 2207 and 2208 and the gate of the control circuit 2218. The reader control unit 2004 checks the ready status signal (PRDY signal) of the printer engine 2002 for the engine control unit 2003 by using the I/O port 2203. If it is OK, the reader control unit 2004 sets the ready status signal (CRDY signal) of the printer engine 2002 for the printer control unit 2005 by using the I/O port 2206.

To set various items, the printer control unit 2005 subsequently communicates with the reader control unit 2004. The reader control unit 2004 receives the setting signals via the serial communication control unit 2205 and interprets them by the CPU 2209. In accordance with a result of the interpretation, the reader control unit 2004 sets various items for the engine control unit 2003 via the serial communication control unit 2202.

In response to the series of commands, the engine control unit 2003 returns the corresponding status signals to the reader control unit 2004. When the status signal from the engine control unit 2003 is received via the serial communication control unit 2202, the reader control unit 2004 interprets the contents by the CPU 2209 and transmits them to the printer control unit 2005 by using the serial communication control unit 2205.

Thus, the printer control unit 2005 generates the printing request signal (CPRNT signal) to the reader control unit 2004. The reader control unit 2004 generates the printing request signal (PPRNT signal) to the engine control unit 2003 in accordance with the request. The PTOP signal is returned from the engine control unit 2003 to the reader control unit 2004 after the elapse of a predetermined time in a form responsive to the printing request. The reader control unit 2004 allows the PTOP signal to be passed through the gate 2208 and transfers it as a CTOP signal to the printer control unit 2005.

In the printer control unit 2005, the CVDO signal is outputted to the reader control unit 2004 synchronously with the CVCLK in a form such that the vertical scanning direction is synchronized with the CTOP signal and the horizontal scanning direction is further synchronized with the CLSYNC signal transmitted through the gate 2207. The reader control unit 2004 is set so that the selector 2201 selects the signal from the printer control unit 2005. The signals sent from the printer control unit 2005 are transmitted as a PVCLK signal, a PVDOEN signal, and a PVDO signal from the reader control unit 2004 to the engine control unit 2003.

Difference Between the Operation in Printing and the Operation in Copying

A difference between the operation in printing and the operation in copying will now be described with respect to the image transmitting timing. Although the description about the detailed construction of the printer control unit 2005 is omitted, the printer control unit has therein an image memory and the image data to be printed has previously been stored in the image memory. Therefore, a time which is required until the printer control unit 2005 can generate the printing data (VDO signal) in response to the image top request signal (TOP signal) sent from the engine control unit 2003 is equal to only an electrical delay time. Actually, since there is also a time that is required for the mechanical operation which is performed by the printer engine 2002 after the generation of the TOP signal, the delay time (referred to as DT1) is equal to about 2 seconds.

Figure 14:
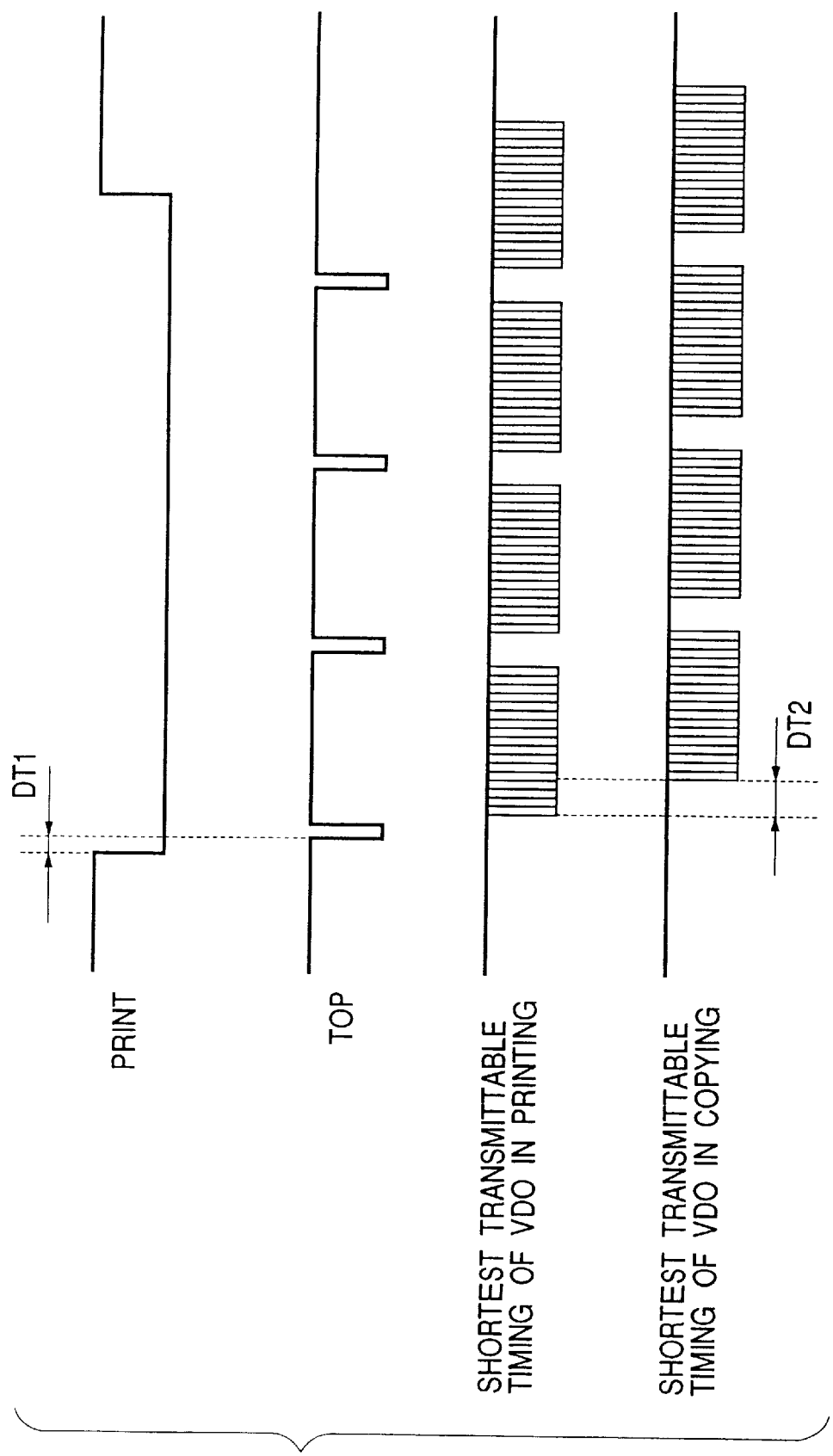
FIG. 14 is a timing chart showing a difference between image transmittable timings in copying and printing.

On the other hand, in the copying mode, the original is read out and the image data is outputted while controlling the optical scanning system of the reader unit 101 and it takes a relatively long time until the printing data (VDO signal) can be outputted (the printer enters a usable state). That is, as shown in FIG. 14, a time from the state where the fluorescent lamp 103 of the reader unit 101 is lit off and the optical scanning system stops to timing when the lamp is lit on and the optical scanning system enters a moving state is necessary. As such a time, for example, a time in a range from about a few seconds to ten seconds (this time is labelled to DT2) is required. The necessary time DT2 is equal to the time (T4=T1+T2+T3) from the start of the lamp lighting control in FIG. 13 mentioned above to the timing when the lamp is actually lit on at a desired stable light quantity and the image can be read out.

Therefore, if the engine control unit 2003 transmits the image top request signal (TOP signal) in the copying mode at timing similar to that in the printing mode, an arrival time of the video data (VDO signal) to the printer engine 2002 is longer than that in the printing mode.

As a countermeasure for such a problem, the first method of transmitting the TOP signal in the copying mode earlier than the printing mode and the second method of providing another signal (RSTART signal) for the copying mode are considered.

To execute the first method, it is sufficient to use a construction of FIG. 12 as a construction as it is in the reader control unit 2004. The engine control unit 2003 transmits the TOP signal in the copying mode earlier than the printing mode. However, since the TOP signal is generated in response to the PRNT signal, there is only a method of making the transmitting timing of the TOP signal early by shortening the time DT1 that is required for response. When DT2>DT1, therefore, it is impossible to cope with such a situation by the first method.

Figure 15:
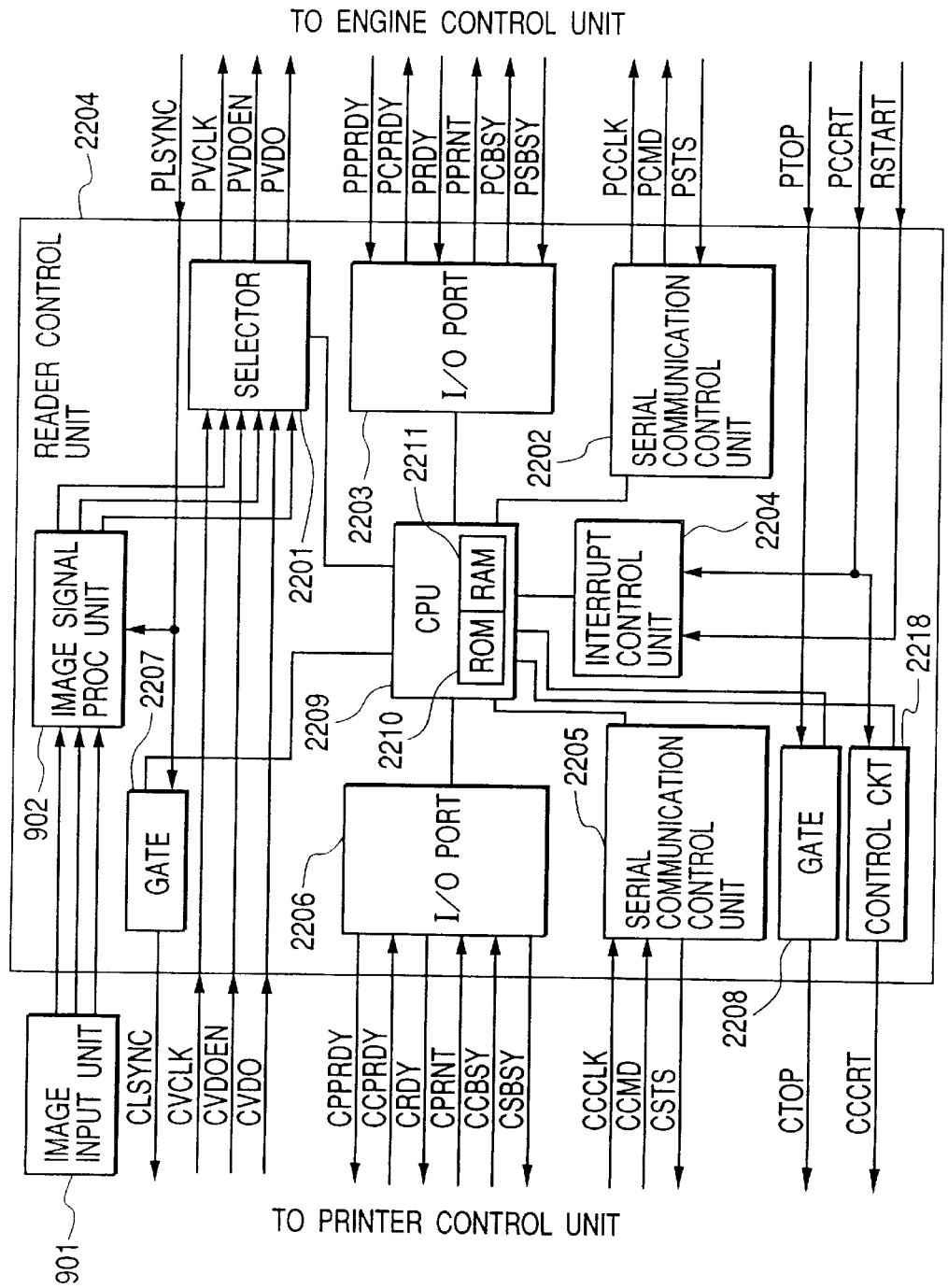
FIG. 15 is a block diagram showing another detailed construction of a reader control unit.

To execute the second method, it is sufficient to construct the reader control unit 2004 as shown in FIG. 15. That is, the image top request signal (PTOP signal) which is transmitted from the engine control unit 2003 is a signal that is necessary only when the printer control unit 2005 prints and doesn't need to be inputted to the interrupt control unit 2205 of the reader control unit 2204. A reading apparatus movement start request signal (RSTART signal) which is sent from the engine control unit 2003 is a signal necessary only in the copying mode and does not need to be transmitted to the print control unit 2005.

Figure 16:
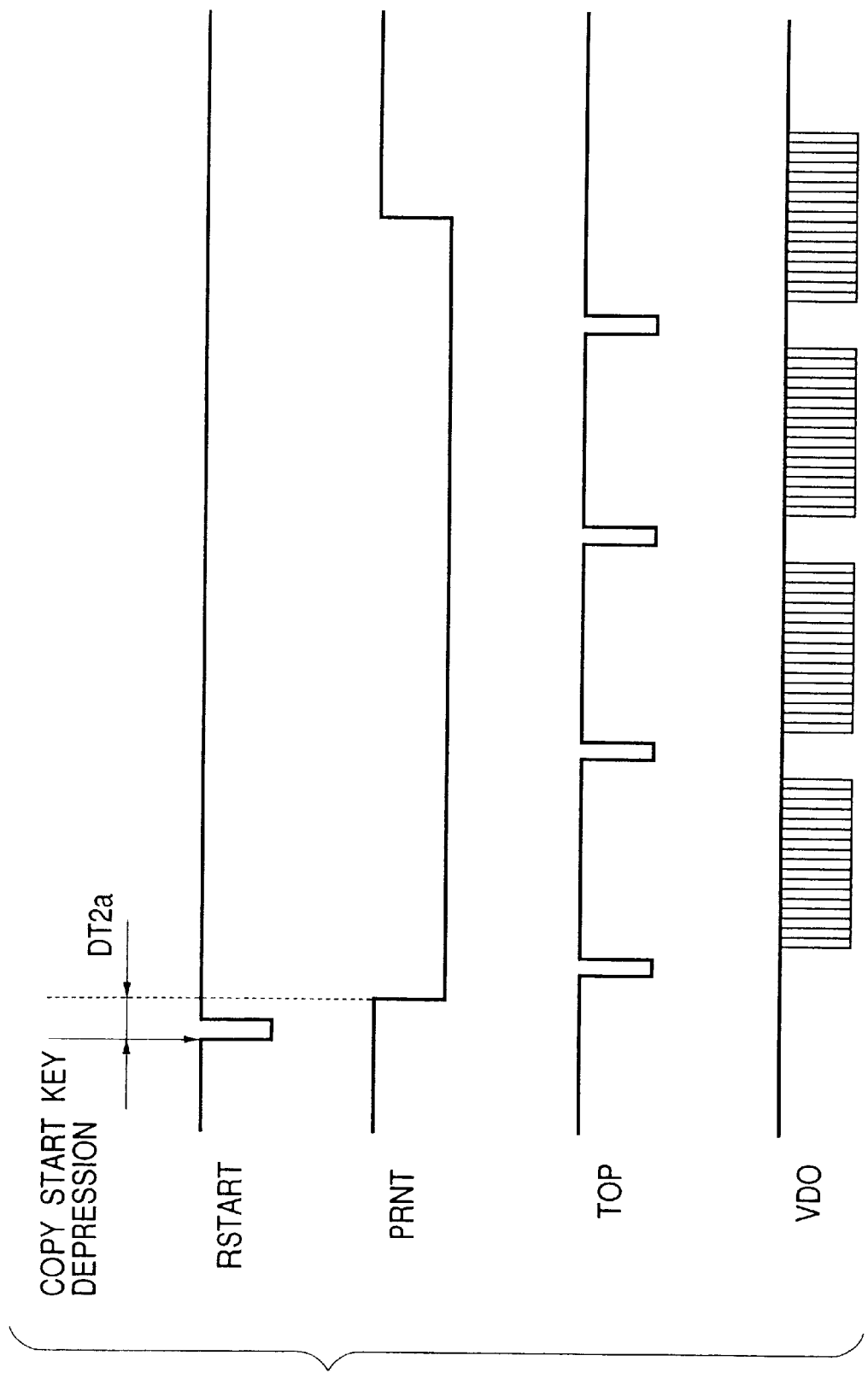
FIG. 16 is a timing chart showing an image signal and an RSTART signal in a second method to avoid a situation such that the transmission timing of the image signal in copying is later than that in printing.

FIG. 16 shows a timing chart of the image signal and the RSTART signal in the second method. The RSTART signal is transmitted much before the PRNT signal is transmitted (this time is referred to DT2a) and the reader unit 101 is preliminarily activated, thereby enabling the TOP signal and VDO signal to be transmitted at timings similar to those in the printing mode. That is, it is sufficient that when the RSTART signal from the engine control unit 2003 is received, the reader control unit 2004 transmits the PRNT signal in a manner such that (DT2<DT2a), namely, after waiting for only DT2a after the activation of the reader unit 101.

Switching Control According to Deterioration in Lamp

A control peculiar to the embodiment, namely, a communication switching control (lighting control switching) according to the lamp deterioration between the printer control unit 2005 and engine control unit 2003 in the case where the reader control unit 2004 is connected between the printer control unit 2005 and engine control unit 2003 to thereby allow both the printing function and the copying function to be used in common will now be described. It will be obviously understood that the communication switching control is performed in a form so as not to obstruct the communication between the printer control unit 2005 and engine control unit 2003.

As mentioned above, according to the second method, the delay time from the TOP signal to the VDO signal in copying can be shortened to a delay time similar to that in printing. However, a necessary time T4 that is required until the fluorescent lamp 103 is lit on is prolonged in accordance with the accumulated lighting time of the fluorescent lamp 103. Therefore, if DT2a is set to be sufficiently long so as to certainly satisfy the relation (DT2<DT2a) even at the end of the life of the lamp, a vain waiting time of a few seconds occurs at the initial stage of the lamp life when it takes time of only hundreds of milliseconds from the start of the lamp lighting control to a point when the fluorescent lamp 103 is actually lit on at a desired stable light quantity.

The vain waiting time is a time enough to make the user irritated. To avoid such vain waiting time, there is only a method of exchange the fluorescent lamp 103 at timing when there is still a little time until the lamp is not perfectly lighted before the arrival at the life. This method causes an increase in costs. Although the necessary lighting time of the fluorescent lamp 103 at the end of the life certainly becomes long, it is not stable. For example, although the fluorescent lamp 103 at the initial stage of the life is stably lit on in 0.5 second, the fluorescent lamp 103 at the end of the life is lit on in 5 or 6 seconds each time the lighting operation is performed.

Therefore, in the embodiment, when the power source is turned on, the lamp lighting operation test is performed (this operation is called a "primary lighting operation"). A necessary time from the start point of the lamp lighting control to a point when the lamp is actually lit on at a desired stable light quantity is preliminarily counted. The set waiting time DT2a from the RSTART signal to the PRNT signal is changed in accordance with the necessary time, thereby eliminating the vain waiting time and improving the convenience for the user.

That is, a necessary lighting time at the present time point of the fluorescent lamp 103 obtained by the preliminary lighting operation which is executed when the power source is turned on is first labelled to Tp. Tp corresponds to T4 mentioned above and is obtained by adding the time from the point after it was detected by the light adjusting sensor that the lamp light quantity had reached the desired light quantity to the point when the lamp light quantity is stabilized and the image can be read out.

The first mode or the second mode is selected as follows in accordance with the duration of the necessary lighting time Tp. Since the preliminary lighting operation is performed for the purpose of measurement of the necessary lighting time Tp, it is soon lit off after completion of the turn-on of the lamp.

First Mode

Figure 17:
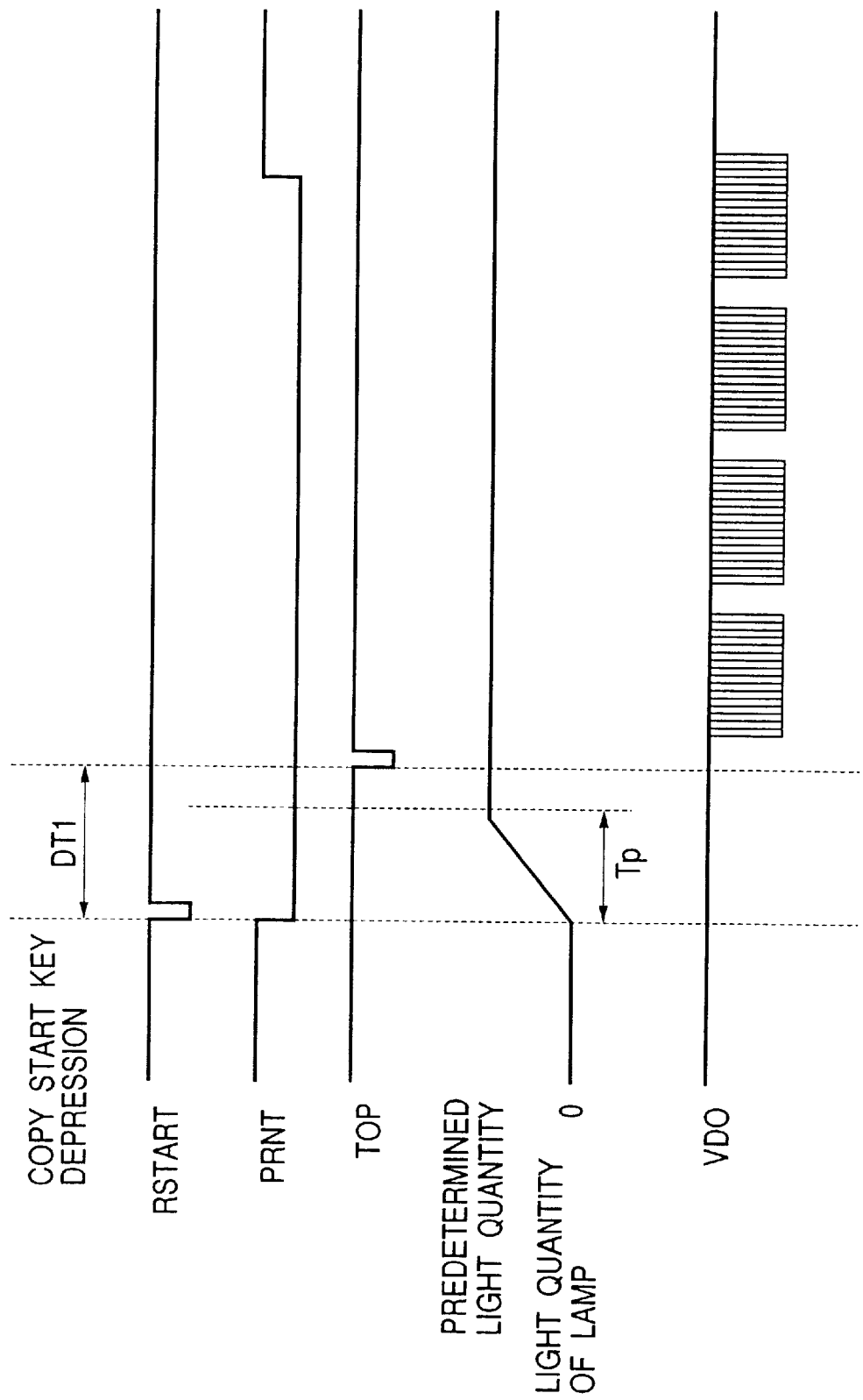
FIG. 17 is a timing chart showing control signals in the case where a light quantity of the light source is settled to a quantity in which an original can be promptly read in an improved method of the second method.

When Tp<DT1, it is sufficient that the waiting time DT2a from the transmission of the RSTART signal to the transmission of the PRNT signal is equal to, for example, "0". FIG. 17 shows a timing chart in this case. In this case, the waiting time DT1 inevitably occurs on the printer engine 2002 side. Therefore, if it is preliminarily known that the fluorescent lamp enters a usable state for the waiting time DT1, the reader control unit 2004 does not always provide the vain waiting time and it is sufficient to transmit the PRNT signal simultaneously with the RSTART signal irrespective of the lighting situation of the fluorescent lamp 103. DT2 can be set to a specified time except for "0". That is, the activating timing of the printer engine 2002 is controlled in accordance with the activating timing of the fluorescent lamp 103.

Second Mode

When Tp≧DT1, the following operation is performed. That is, the fluorescent lamp 103 is lit on synchronously with the RSTART signal and the moving operation of the optical scanning system of the reader unit 101 is performed synchronously with the TOP signal. The PRNT signal is transmitted after the light adjusting sensor detected that the fluorescent lamp 103 is in the usable state where it is stably lit on at the desired light quantity.

Figure 18:
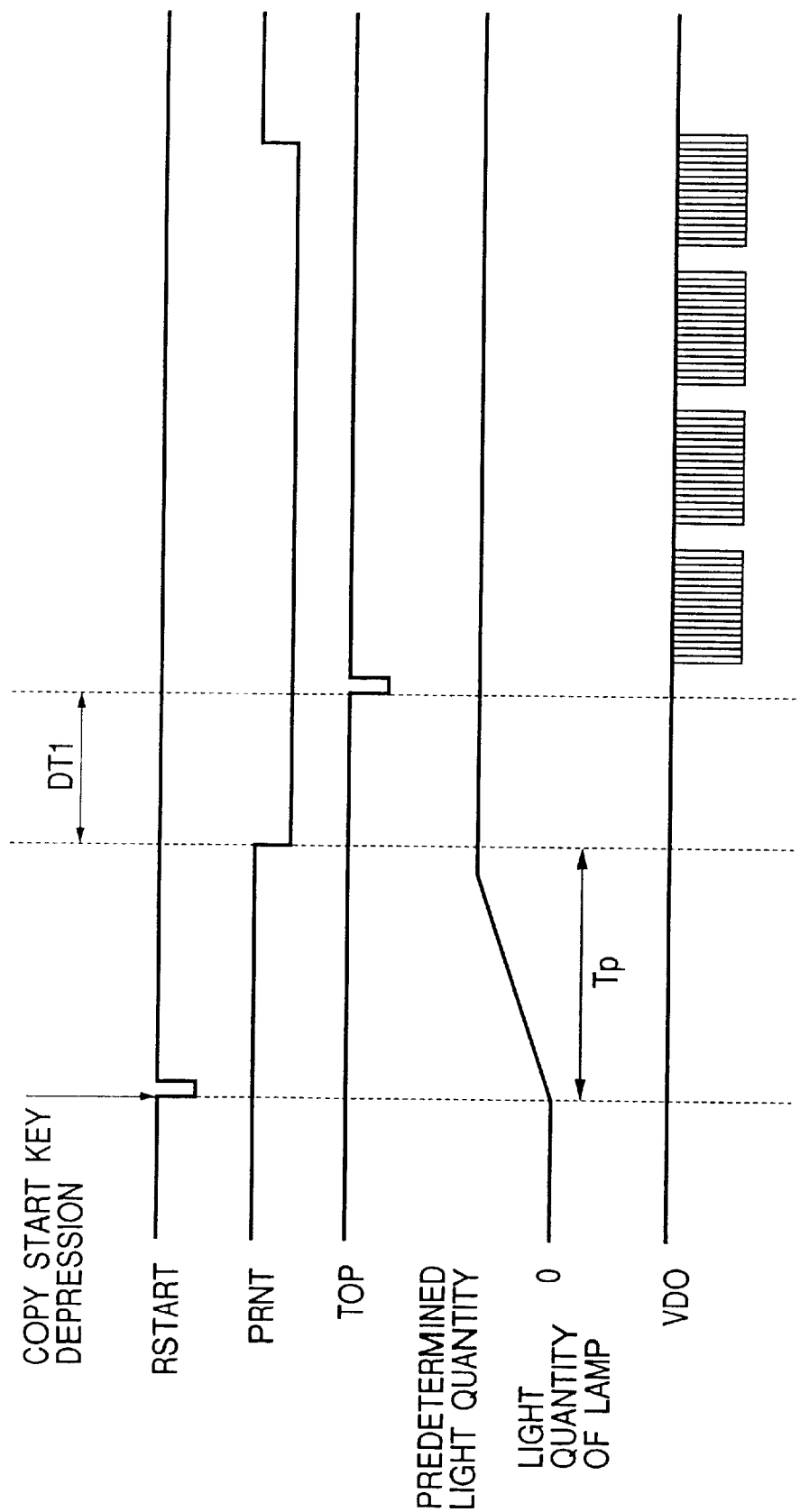
FIG. 18 is a timing chart showing control signals in the case where a long time is required until a light quantity of the light source is settled to a quantity in which an original can be read in the improved method of the second method.

FIG. 18 shows a timing chart when Tp≧DT1. First, the RSTART signal is transmitted from the engine control unit 2003 at timing of the depression of the copy start key. The reader control unit 2004 starts the lighting control of the fluorescent lamp 103. The reader control unit 2004 transmits the PRNT signal after waiting until the fluorescent lamp 103 is lit on at the desired stable light quantity and the image can be read out.

In this case, even if the necessary time T4 from the turn-on of the fluorescent lamp lighting signal to the point when the lamp light quantity reaches a desired value changes, the time from the point when the reader control unit 2004 receives the RSTART signal to the point when the PRNT signal is transmitted merely changes, so that no influence is exerted on the engine control unit 2003. Therefore, in response to the TOP signal which is sent from the engine control unit 2003, the reader control unit 2004 can transmit the VDO signal at timing similar to that in the printing mode. No mismatching occurs in the operation of the reader unit 101 and the operation of the printer engine 2002.

Control for Setting Command

The control for the setting command will now be described. By connecting the reader control unit 2004 between the printer control unit 2005 and engine control unit 2003, a communication is performed as follows between the printer control unit 2005 and engine control unit 2003.

Explanation will now be made with respect to an example in the case where, for example, a paper feed cassette change command is issued as a setting command to the printer engine 2002 from the printer control unit 2005 while the reader control unit 2004 is reading and outputting the original image by using the engine control unit 2003 (in the copying mode).

Figure 19:
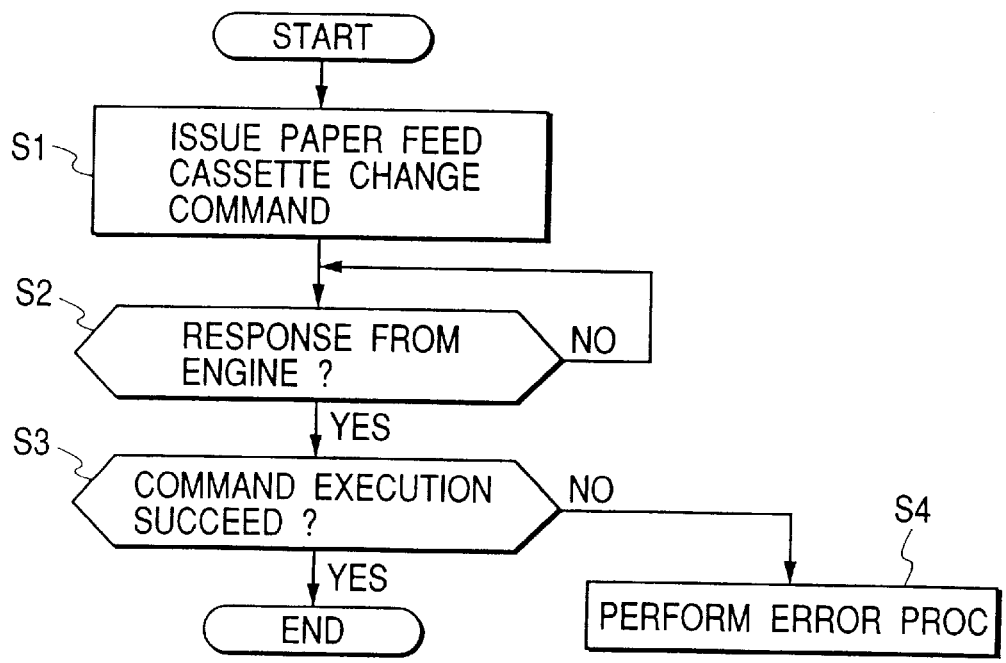
FIG. 19 is a flowchart showing processes of the printer control unit for a setting command in the case where the reader control unit is not attached.
Figure 20:
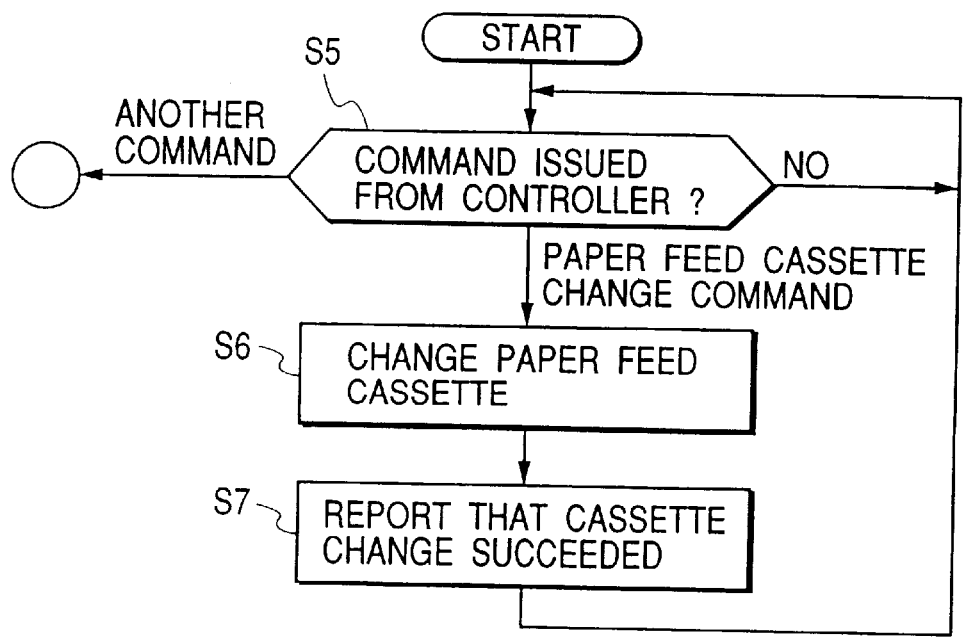
FIG. 20 is a flowchart showing processes of the engine control unit for a setting command in the case where the reader control unit is not attached.

FIGS. 19 and 20 show a flow of a command issuing process in the case where the reader control unit 2004 does not exist, namely, in the construction of FIGS. 2 and 3. FIG. 19 shows processes of the printer control unit 2005. FIG. 20 shows processes of the engine control unit 2003.

After the paper feed cassette change command was issued (step S1), the printer control unit 2005 waits for a response from the engine control unit 2003 (step S2). When the response is received, a check is made to see if the execution of the command has succeeded or not (step S3). When the command execution fails, a predetermined error process is performed (step S4) and the processing routine is finished. When the command execution succeeds, the processing routine is finished as it is. Such a series of command issuing processes is similarly executed for various commands.

The engine control unit 2003 discriminates the contents of the command received from the printer control unit 2005 (step S5). Thus, in case of the paper feed cassette change command, the change of the paper feed cassette is set (step S6). The success in cassette change is notified to the printer control unit 2005 (step S7). The processing routine is returned to step S5 and similar processes are executed for the commands from the printer control unit 2005.

Figure 21:
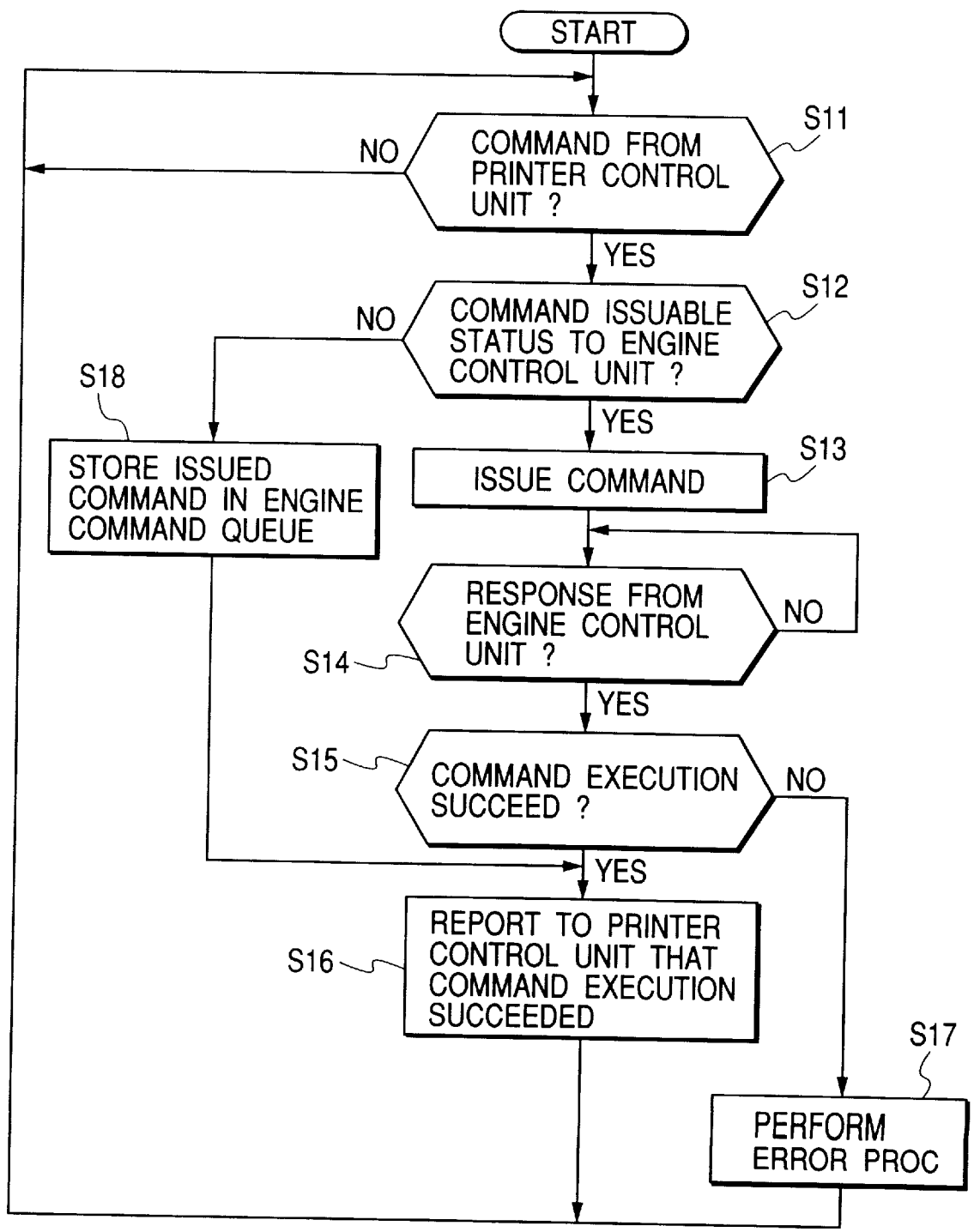
FIG. 21 is a flowchart showing processes of the reader control unit for a setting command in the case where the reader control unit is attached.

When the reader control unit 2004 exists as shown in FIG. 11, the reader control unit 2004 executes a communicating process as shown in FIG. 21 between the printer control unit 2005 and engine control unit 2003. In this case as well, the printer control unit 2005 and engine control unit 2003 execute the communicating process similar to that shown in FIGS. 19 and 20.

In FIG. 21, the reader control unit 2004 receives the command from the printer control unit 2005 as a CCMD signal through the serial communication control unit 2205 (step S11) and discriminates whether the apparatus is at present in a state where the command can be issued as it is to the engine control unit 2003 or not (step S12). For example, if there is at present not any command which is issued from the reader control unit 2004 to the engine control unit 2003 in order to perform the operation in the copying mode, it is regarded that the apparatus is in the command issuable state. The same command as that sent from the printer control unit 2005 is generated to the engine control unit 2003 via the serial communication control unit 2202 and the PCMD signal line (step S13). Subsequently, the apparatus waits for a response from the engine control unit 2003 (step S14). When the response is received, the success or failure of the command execution is discriminated (step S15). When the command execution does not succeed, a predetermined error process is performed (step S17) and the processing routine is returned to step S11. When the command execution succeeds, a message indicative of the success of the command execution is returned to the printer control unit 2005 (step S16). The processing routine is returned to step S11.

In the case such that, for example, while the reader control unit 2004 designates the paper feed cassette and the copying operation is being performed, if the paper feed cassette change command sent from the printer control unit 2005 is issued as it is to the engine control unit 2003, the copying operation is not normally executed or the like, it is determined in step S12 that the apparatus is not in the state where the command can be issued. The issued command is stored into an engine command queue without issuing any command to the engine control unit 2003 (step S18). The commands are accumulated in the engine command queue in accordance with the issuing order from the printer control unit 2005. Since a response to the command needs to be returned to the printer control unit 2005, it is assumed that the command execution falsely succeeded, and a signal indicative of such a false success is returned from the reader control unit 2004 to the printer control unit 2005 via the serial communication control unit 2205 and a CSTS signal line (step S16).

Figure 22:
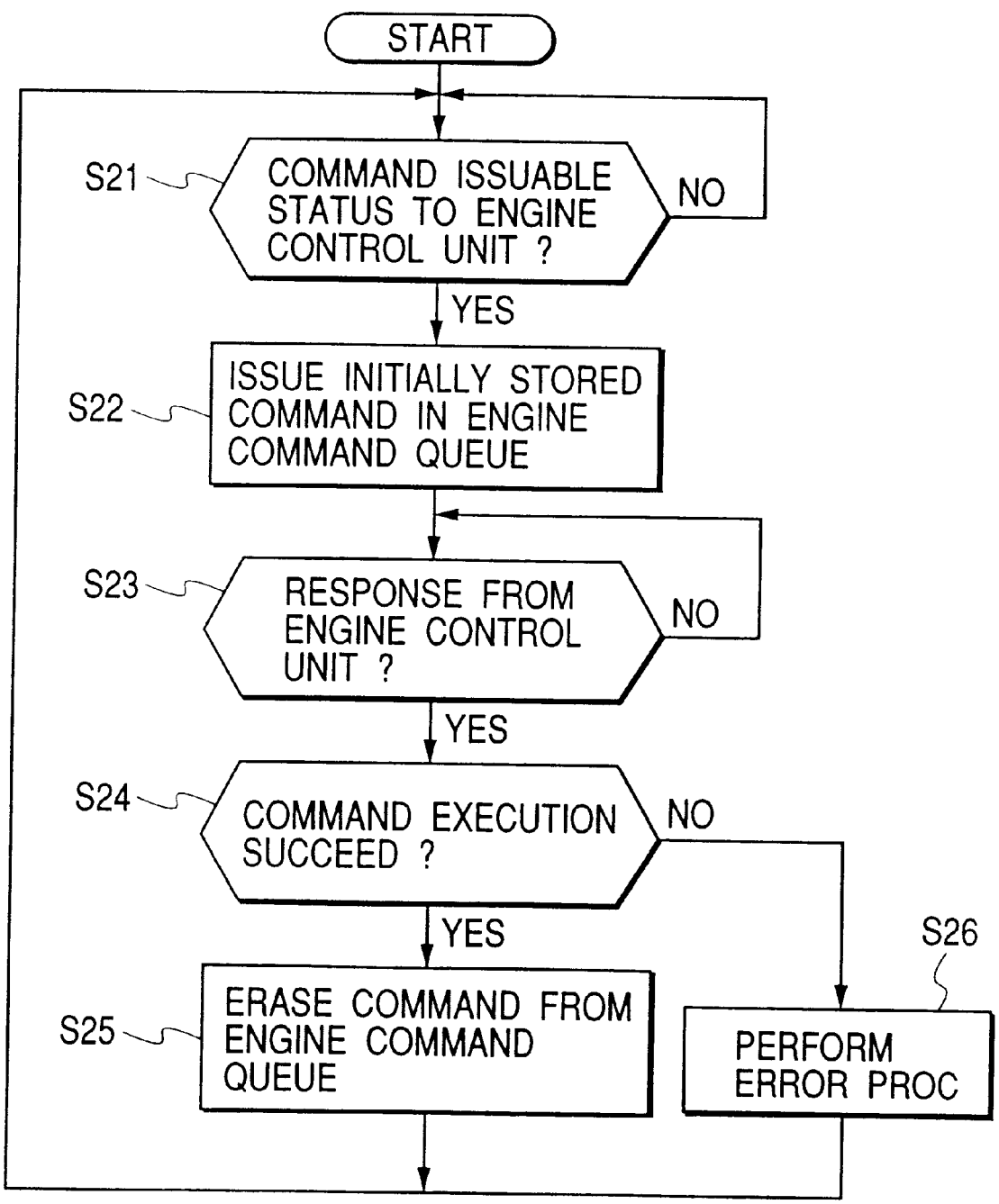
FIG. 22 is a flowchart showing processes of the reader control unit in the case where the apparatus enters a state where a setting command can be issued to the engine control unit.

The case where the apparatus enters a state in which the command from the printer control unit 2005 can be issued to the engine control unit 2003 without exerting an influence on the self status of the reader control unit 2004 will now be described with reference to FIG. 22.

The reader control unit 2004 waits until the apparatus enters the state where the command from the printer control unit 2005 can be issued to the engine control unit 2003 (step S21). When the apparatus enters the command issuable state, the reader control unit 2004 generates the commands stored in the engine command queue to the engine control unit 2003 (step S22). In this instance, the command is issued by using the serial communication control unit 2202 via the PCMD signal line. The command that is issued by the reader control unit 2004 itself is also transmitted to the engine control unit 2003 via the PCMD signal line.

Upon completion of the command execution, a response is returned from the engine control unit 2003 to the reader control unit 2004 via the PSTS signal line, so that the reader control unit 2004 waits for a response from the engine control unit 2003 (step S23) and discriminates the success or failure of the command execution when the response is received (step S24). When the command execution is successful, the commands regarding the success of the command execution are deleted from the engine command queue (step S25). The processing routine is returned to step S21. When it is determined at this time point that the command execution by the printer engine 2002 failed, the process is performed as being in an error occurrence state (step S26) and the processing routine is returned to step S21.

As mentioned above, even in the case of the construction in which the reader control unit 2004 exists, no mismatching occurs in the operations even when an ordinary command is issued from the printer control unit 2004 to the engine control unit 2003.

Control for the Condition Change Signal

In the construction in which the reader control unit 2004 exists, the processes in the case where a fact that the status of the printer engine 2002 changed (for example, some error generating state occurs) is notified to the reader control unit 2004 from the engine control unit 2003 by using the PCCRT signal will now be explained.

In case of the construction with the reader control unit 2004, there is a possibility that a status change which the user wants to know in the reader control unit 2004 and that in the printer control unit 2005 differ. For example, there is a case where a status change such that the recording paper during the conveyance jams occurs. If a jam occurs when the printer engine 2002 is performing the copying operation under the control of the reader control unit 2004, this status is a status which only the reader control unit 2004 wants to know. As a printer control unit 2005, since such a jam is not a jam for a period of time during which the printer control unit itself is outputting the image data, even if such a status is notified, a proper post process cannot be executed.

If the user tries to install a control system equivalent to the reader control unit 2004 into the printer control unit 2005, software of a jam processing control which should be possessed by the other control unit is installed on both the control units, so that the software is overlappingly installed. It is disadvantageous in terms of points of the number of designing steps, quality evaluation, capacity of the software, and the like.

It is, therefore, fundamentally sufficient to notify the printer control unit 2005 of the status change in the printing mode and notify the reader control unit 2004 of the status change in the copying mode without installing the control system equivalent to the reader control unit 2004 into the printer control unit 2005. However, even in the copying mode, there is also a case where the printer control unit 2005 wants to know the status change of the printer engine 2002. For example, it is necessary to also notify the printer control unit 2005 of the information such as change in cassette size, absence of paper, or the like. However, with respect to the change in recording paper feed cassette, namely, as for the information such as change in recording paper size, absence of recording paper, or the like, there is no need to severely set the time which is required from the point when the information is issued by the engine control unit 2003 to the point when the process is performed in each control unit.

Therefore, processes as will be explained hereinbelow are executed. That is, in the copying mode in which the reader control unit 2004 controls the engine control unit 2003, the condition change signal (PCCRT signal) reported from the engine control unit 2003 is masked for the printer control unit 2005 by using the gate function of the control circuit 2218 and is received by only the reader control unit 2004 via the interrupt control unit 2204.

Figure 23:
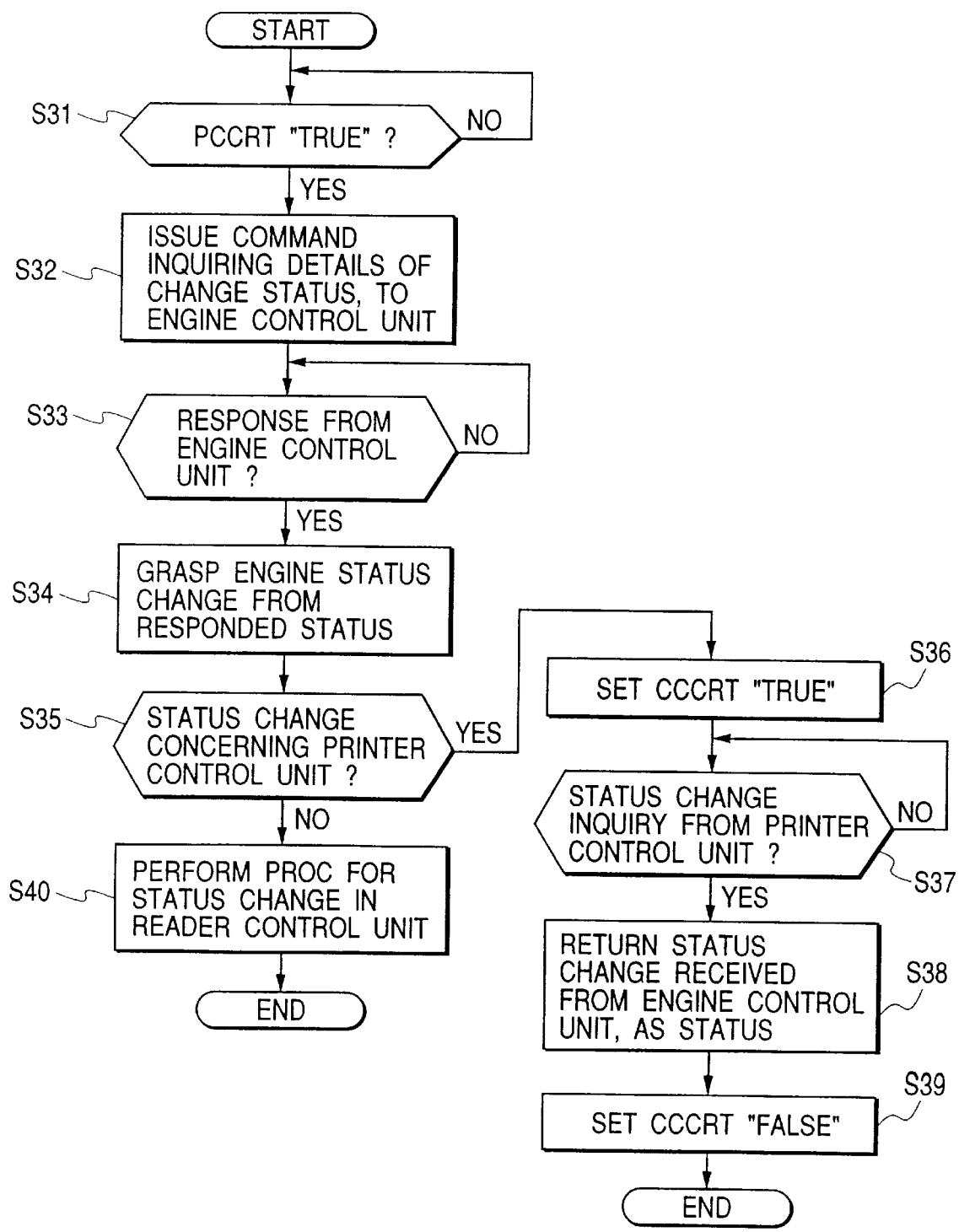
FIG. 23 is a flowchart showing an obtaining process of a status of a printer engine in the case where the reader control unit is attached.

The reader control unit 2004 executes processes in accordance with a control flow of FIG. 23. That is, at a point when the PCCRT signal becomes true (step S31), the reader control unit 2004 issues a command to obtain the status change to the engine control unit 2003 (step S32). After that, the status transmitted from the engine control unit 2003 is checked (step S33), thereby knowing the contents of the status change of the printer engine 2002 (step S34).

A check is made to see if the contents of the status change should be also reported to the printer control unit 2005 (step S35). For example, the status change such that the recording paper feed cassette was changed is determined as a status change which should be also reported to the printer control unit 2005. When it is decided that the contents of the status change should be notified, the flag is set by using the control circuit 2218, the condition change signal (CCCRT signal) is generated, thereby notifying the printer control unit 2005 of the status change (step S36).

The apparatus subsequently waits for an inquiry of the status change from the printer control unit 2005 (step S37). When there is the inquiry, the condition change signal (status) received from the engine control unit 2003 is immediately transmitted to the printer control unit 2005 (step S38). The CCCRT signal is set to be false (step S39). The processing routine is finished. When it is determined in step S35 that the contents of the status change should not be reported to the printer control unit 2005, the process corresponding to the status change is executed by only the reader control unit 2004 (step S40). The processing routine is finished.

In the printing mode in which the printer control unit 2005 controls the engine control unit 2003, the reader control unit 2004 opens the gate in the control circuit 2218 and all of the condition change signals (PCCRT signals) reported from the engine control unit 2003 are notified as condition change signals (CCCRT signals) to the printer control unit 2005.

Control for Execution Command

A control of an execution command will now be described. For example, which control is executed by the reader control unit 2004 in the case where both the printer control unit 2005 and reader control unit 2004 simultaneously issue a using request to the engine control unit 2003 will now be described.

FIG. 24 is a diagram showing the location of the data when a printing request is generated during the copying operation and the transmission and reception of the data.

In the copying operation, the engine control unit 2003 forms an image on the basis of the video signal (PVDO signal) from the reader control unit 2004. In this case, the designation of the paper feed cassette, the designation of the paper discharge port, and the image formation mode as described in FIG. 9 have already been set in the serial communication between the reader control unit 2004 and engine control unit 2003.

In FIG. 24, reference numeral 1301 denotes a buffer for setting various items. The values set into the engine control unit 2003 by the reader control unit 2004 and the values set into the engine control unit 2003 by the printer control unit 2005 have been stored in buffers for reader and PDL (Page Description Language, namely, printer control unit) in the diagram, respectively.

It is not desirable from a viewpoint of usability to perform the print-out by interrupting the copying operation in the case where the printing request is issued from the printer control unit 2005 during the copying operation. Therefore, the printing request in this case is postponed until the end of the copying operation. However, the CSTS signal has to be returned from the printer control unit 2005 in response to the CCMD signal. Therefore, the set values from the printer control unit 2005 are also held and temporarily set in the buffer for PDL in accordance with the request. When the set values for the reader and those for PDL are different, the copying operation is finished. Before the printing operation is started, various items are set from the reader control unit 2004 to the engine control unit 2003.

Practical examples will now be described. That is, it is now assumed that the copying operation is now being performed, the recording paper is fed from the upper recording paper feed cassette, and paper is conveyed to the face-up paper discharge port, and the image formation mode has been set to the color mode. In this state, when the printing request is generated from the printer control unit 2005, although the printing execution itself is postponed, the setting of various items is performed. For example, it is assumed that the printing request is set such that the recording paper is fed from the upper recording paper feed cassette, the paper is conveyed to the face-down paper discharge port, and a black and white image is outputted. In this case, the upper paper feed cassette is designated for both the reader control unit 2004 and printer control unit 2005. Therefore, even when the copying operation is finished and switched to the printing operation, there is no need to issue a paper feed cassette designation command to the engine control unit 2003. Since the paper discharge port and the image formation mode are designated to different ports and modes in the copying operation and the printing operation, a paper discharge port designation command and an image formation mode designation command are newly issued from the reader control unit 2004 to the engine control unit 2003 at a point when the copying operation is finished.

As mentioned above, the reader control unit 2004 does not perform the process to merely postpone the command execution to the engine control unit 2003 in response to the command from the printer control unit 2005 but prevents that the commands which have already been set into the engine control unit 2003 by the reader control unit 2004 are overlappingly set.

A case where the copying request is generated during the printing operation will now be described with reference to FIG. 25. In this case, opposite to the case of FIG. 24, it is better that the copying operation can be executed in an interrupting manner from a viewpoint of usability rather than a situation such that even if the copy start key is depressed, the copying operation cannot be performed because the printing operation is being executed.

As shown in FIG. 25, the CVDO signal transmitted from the printer control unit 2005 is selected by the selector 2201 during the printing operation and sent as a PVDO signal to the engine control unit 2003. It is now assumed that the upper paper feed cassette, face-down paper discharge port, and black and white image mode are set from the printer control unit 2005 in substantially the same manner as the case described in FIG. 24.

Since the engine control unit 2003 can detect the end only when the PPRNT signal from the printer control unit 2005 is set to the high level (false), the number of papers which are printed out cannot be recognized. Now assuming that four images are printed out, unless the copying operation is requested from the reader control unit 2004 by interruption, four PTOP signals are generated from the engine control unit 2003 and the image data is sent from the printer control unit 2005 to the engine control unit 2003 via the reader control unit 2004 in response to those signals.

Figure 26:
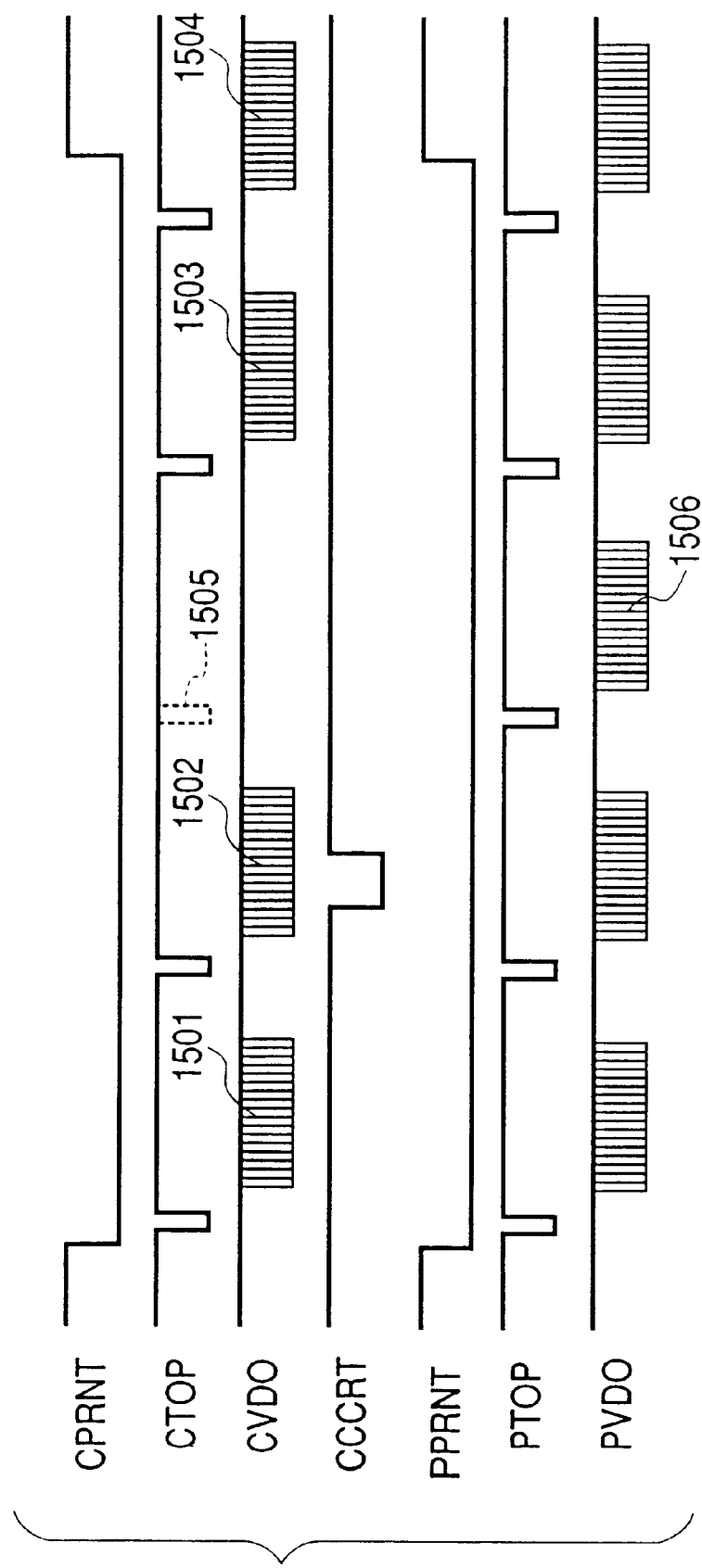
FIG. 26 is a time chart showing a signal generating state in an interruption copy.
Figure 27:
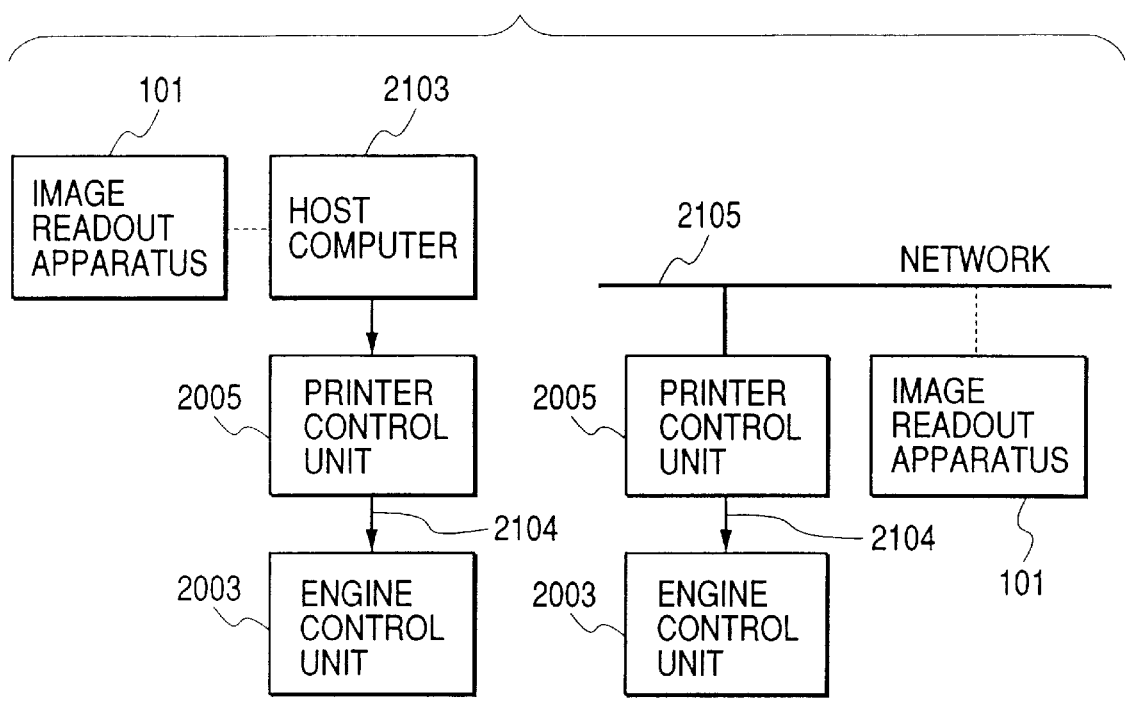
FIG. 27 is a block diagram showing a conventional example.
Figure 28:
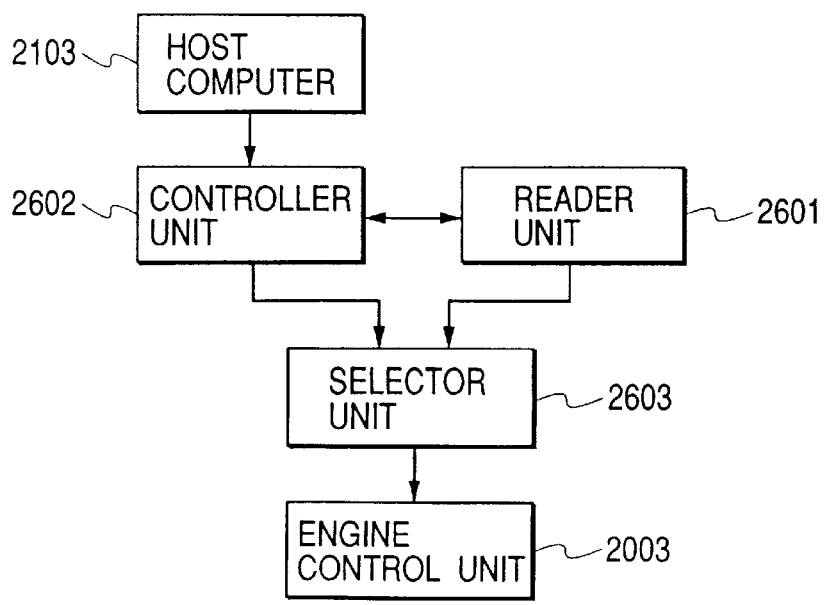
FIG. 28 is a block diagram showing another conventional example.

It is now assumed that an interrupt copying request to copy one sheet of a color original during the printing operation of the second sheet is generated to the reader control unit 2004. This example will now be described with reference to FIG. 26. The reader control unit 2004 issues a PPRNT request to the engine control unit 2003 in response to a CPRNT request from the printer control unit 2005. Thus, the PTOP signal is supplied as a CTOP signal from the engine control unit 2003 to the printer control unit 2005 via the reader control unit 2004. In this manner, the printing operations of the first image shown at 1501 and the second image shown at 1502 are executed.

When the interrupt copying request is detected during the printing operation of the second sheet, the reader control unit 2004 sends a CCCRT signal to the printer control unit 2005. This means that the status of the printer engine 2002 does not actually change but the printer control unit 2005 is requested to open the printer engine 2002 in order to get the using right of the printer engine 2002 by the reader control unit 2004.

As mentioned above, the control circuit 2218 is used when the CCCRT signal is transmitted. In response to the CCCRT signal, the printer control unit 2005 issues a command to check the status of the printer engine 2002. In response to it, the reader control unit 2004 returns the status indicating that the copying operation is being performed to the printer control unit 2005. Thus, the printer control unit 2005 detects that the printer engine 2002 is performing the copying operation, and continuously waits for the arrival of the CTOP signal with the CPRNT signal held at the low level (true).

If the operating status is not the copying status, if the CTOP signal is not sent with the CPRNT signal held at the low level (true), a time-out error occurs after the elapse of a predetermined time. However, in case of the copying status, the time-out is cancelled on the printer control unit 2005 side and the apparatus is set so as to permanently wait for the CTOP signal. In the current case, the PTOP signal which is sent from the engine control unit 2003 is used to perform the copying operation and the PTOP signal is used on the reader control unit 2004 side. As shown at 1505, the PTOP signal sent from the engine control unit 2003 is masked to the printer control unit 2005. The image signal which is actually formed by the reader control unit 2004 is only an image signal 1506.

After completion of the interrupt copy of one sheet, the mask of the PTOP signal is again cancelled and the PTOP signal is sent as a CTOP signal to the printer control unit 2005, so that image signals 1503 and 1504 from the printer control unit 2005 can be transferred to the engine control unit 2003 and printed out.

As mentioned above, in accordance with the statuses of the printer control unit 2005 and reader control unit 2004, the reader control unit 2004 discriminates and controls about which one of the printer control unit 2005 and reader control unit 2004 gets the using right of the printer engine 2002 and at which timing the command is issued, thereby enabling the printing process regarding the requests from two control units to be executed even by only one printer engine 2002.

Control for Setting Contents Check Command

A control when the printer control unit 2005 issues a setting contents check command will now be described.

When the printer control unit 2005 wants to confirm the statuses set in the engine control unit 2003, the printer control unit 2005 issues the setting contents check command as a CCMD signal. The reader control unit 2004 which received it checks the setting value storing buffer 1301 in FIG. 24. If the contents to be confirmed by the printer control unit 2005 exist in the buffer 1301, the contents are read out and notified to the printer control unit 2005 via the CSTS signal line.

If the contents are not stored in the setting value storing buffer 1301, the reader control unit 2004 transfers the setting contents check command to the engine control unit 2003 via the PCMD signal line. The engine control unit 2003 reads out the contents and notifies the reader control unit 2004 of the corresponding setting contents through the PSTS signal line. The reader control unit 2004 notifies the printer control unit 2005 of the contents through the CSTS signal line.

According to the embodiment as described above, in the image forming apparatus having both the printing function and the copying function, when the power source is turned on, the necessary time which is required from the light-on of the light source 103 to the timing when the light quantity of the light source is equal to the stable light quantity in which the original can be read out is preliminarily counted. When the copying process is actually performed, if the necessary time which has previously been counted is shorter than a predetermined time, the image forming operation by the reader unit 101 is activated after the elapse of the specified time after the turn-on of the light source. When the necessary time is equal to or longer than the predetermined time, it is confirmed that the light quantity of the light source 103 is equal to the stable light quantity in which the original can be read out and, after that, the image forming operation by the reader unit 101 is activated.

Thus, in the case of a state where the accumulated lighting time of the light source 103 is short and the light quantity is equal to the stable light quantity in which the original can be promptly read out, the copying process can be quickly started. Even in the case where the accumulated lighting time of the light source 103 is long and it takes a long time until the light quantity is equal to the stable light quantity in which the original can be promptly read out, there is not need to exchange the light source 103. In other words, the vain waiting time until the start of the copying process is eliminated while the period of time of the light source 103 which can be used is prolonged as long as possible, the increase in costs is avoided, and the usability of the user is improved.

The invention is not limited to the foregoing embodiment but can be also applied to, for example, an image forming apparatus in which a light source other than the fluorescent lamp is installed.

According to the embodiment as described above, in the image forming apparatus having both the printing function and the copying function, the copying operation can be performed as fast as possible without increasing the costs.

Although the invention has been described with respect to the preferred embodiment, the present invention is not limited to the foregoing embodiment but many modifications and variations are possible within the spirit and scope of the appended claims of the invention.

What is claimed is:

1. An image forming apparatus in which an original image is read out by an image reader unit and a copy image is outputted from an image forming unit, comprising:

a counting unit adapted to count a necessary time from the start of activation of a light source of said image reader unit to timing when said light source enters a usable state; and a control unit adapted to control in a manner such that in the case where said necessary time counted by said counting unit is shorter than a predetermined time, said image forming unit is activated when said light source is activated or after the elapse of a specified time, and in the case where said necessary time counted by said counting unit is longer than said predetermined time, said image forming unit is activated after it was detected that the light source of said image reader unit entered the usable state.

2. An apparatus according to claim 1, wherein said light source includes a fluorescent lamp.

3. An apparatus according to claim 1, further comprising:

a printer control unit adapted to convert image data transmitted from outside of the apparatus into data of a raster format;

an engine control unit adapted to control the image forming operation by said image forming unit; and a reader control unit adapted to control the original image reading operation by said image reader unit, and wherein said counting unit and control unit are included in said reader control unit.

4. An apparatus according to claim 3, wherein when said necessary time counted by said counting unit is longer than said predetermined time, said engine control unit requests said reader control unit to start the original image reading operation by said image reader unit before an image formation is instructed from said reader control unit.

5. An apparatus according to claim 3, wherein when said necessary time counted by said counting unit is shorter than said predetermined time, said reader control unit is requested from said engine control unit so as to start the original image reading operation by said image reader unit and, at the same time, instructs an image formation to said engine control unit.

6. An apparatus according to claim 1, wherein said image forming unit is used in common in case of executing a copying function and in case of executing a printing function to form an image on the basis of image data transmitted from an outside of the apparatus.

7. An apparatus according to claim 1, wherein said counting unit executes the counting operation when a power source of the apparatus is turned on.

8. An apparatus according to claim 1, further comprising a detecting unit adapted to detect a quantity of light from a light source of said image reader unit.

9. An image forming method in which an original image is read out by an image reader unit and a copy image is outputted from an image forming unit, comprising:

a counting step of previously counting a necessary time from the start of activation of a light source of said image reader unit to timing when said light source enters a usable state; and a control step of controlling in a manner such that in the case where said necessary time counted in said counting step is shorter than a predetermined time, said image forming unit is activated when said light source is activated or after the elapse of a specified time, and in the case where said necessary time counted in said counting step is longer than said predetermined time, said image forming unit is activated after it was detected that the light source of said image reader unit entered the usable state.

10. A method according to claim 9, wherein said light source includes a fluorescent lamp.

11. A method according to claim 9, wherein said image forming unit is used in common in case of executing a copying function and in case of executing a printing function to form an image on the basis of image data transmitted from outside of the apparatus.

12. A method according to claim 9, wherein in said counting step, the counting operation is executed when a power source of the apparatus is turned on.

13. A method according to claim 9, further comprising a step of detecting a light quantity of a light source of said image reader unit.

14. A computer readable storing medium in which an image formation control program to execute an image forming method in which an original image is read out by an image reader unit and a copy image is outputted from an image forming unit has been stored, wherein said program comprises:

a counting step of previously counting a necessary time from the start of activation of a light source of said image reader unit to timing when said light source enters a usable state; and a control step of controlling in a manner such that in the case where said necessary time counted in said counting step is shorter than a predetermined time, said image forming unit is activated when said light source is activated or after the elapse of a specified time, and in the case where said necessary time counted in said counting step is longer than said predetermined time, said image forming unit is activated after it was detected that the light source of said image reader unit entered the usable state.

15. An image forming system comprising:

an image reader unit for reading an original image;

an image forming unit for outputting a copy image of the original, image read out by said image reader unit;

a counting unit adapted to count a necessary time from the start of activation of a light source of said image reader unit to timing when said light source enters a usable state; and a control unit adapted to control in a manner such that in the case where said necessary time counted by said counting unit is shorter than a predetermined time, said image forming unit is activated when said light source is activated or after the elapse of a specified time, and in the case where said necessary time counted by said counting unit means is longer than said predetermined time, said image forming unit is activated after it was detected that the light source of said image reader unit entered the usable state.

16. An image forming apparatus in which an original image is read out by an image unit and a copy image is outputted from an image forming unit, comprising:

a detecting unit adapted to detect that a light source of said image reader unit is in a usable state;

a first control unit adapted to activate said image forming unit at specified timing according to activation start timing of said light source irrespective of a result of the detection of said detecting unit; and a second control unit adapted to activate said image forming unit in accordance with the detection result of said detecting unit.

17. An apparatus according to claim 16, further comprising:

a counting unit adapted to count a necessary time from the start of activation of said light source of said image reader unit to timing when said light source enters a usable state; and a selecting unit adapted to select either said first control unit or said second control unit in accordance with a result of the counting of said counting unit.

18. An image forming apparatus in which an original image is read out by an image reader unit and a copy image is outputted from an image forming unit, comprising:

an obtaining unit adapted to obtain a necessary time for a light source of said image reader unit to enter a usable state; and a control unit adapted to control a timing to activate said image forming unit based on said necessary time obtained by said obtaining unit.

19. An apparatus according to claim 18, wherein said light source includes a fluorescent lamp.

20. An apparatus according to claim 18, further comprising:

a printer control unit adapted to convert image data transmitted from outside of the apparatus into data of a raster format;

an engine control unit adapted to control the image forming operation by said image forming unit; and a reader control unit adapted to control the original image reading operation by said image reader unit, wherein a measuring unit and said control unit are included in said reader control unit.

21. An apparatus according to claim 18, wherein said image forming unit is used in common in case of executing a copying function and in case of executing a printing function to form an image on the basis of image data transmitted from outside the apparatus.

22. An apparatus according to claim 18, wherein said obtaining unit comprises a counting unit that counts said necessary time.

23. An apparatus according to claim 21, wherein said counting unit executes the counting operation when a power source of the apparatus is turned on.

24. An apparatus according to claim 18, further comprising a detecting unit that detects a quantity of light from a light source of said image reader unit.

25. An image forming method in which an original image is read out by an image reader unit and a copy image is outputted, from an image forming unit, comprising:

an obtaining step of previously obtaining a necessary time for a light source of said image reader unit to enter a usable state; and a control step of controlling a time to activate said image forming unit based on said necessary time obtained in said obtaining step.

26. A method according to claim 25, wherein said light source includes a fluorescent lamp.

27. A method according to claim 25, wherein said image forming unit is used in common in case of executing a copying function and in case of executing a printing function to form an image on the basis of image data transmitted from outside the apparatus.

28. A method according to claim 25, wherein said obtaining step comprises a counting step of counting said necessary time.

29. A method according to claim 28, wherein in said counting step, the counting operation is executed when a power source of the apparatus is turned on.

30. A method according to claim 25, further comprising a step of detecting a quantity of light from a light source of said image reader unit.

31. A computer readable storing medium in which an image formation control program to execute an image forming method in which an original image is read out by an image reader unit and a copy image is outputted from an image forming unit has been stored, wherein said program comprises:

an obtaining step of previously obtaining a necessary time for a light source of said image reader unit to become a usable state; and a control step of controlling a timing to activate said image forming unit based on said necessary time obtained in said obtaining step.

* * * * *

UNITED STATES PATENT AND TRADEMARK OFFICE
CERTIFICATE OF CORRECTION

PATENT NO. : 6,185,384 B1
DATED : February 6, 2001
INVENTOR(S) : Koichi Ishimoto It is certified that error appears in the above-identified patent and that said Letters Patent is hereby corrected as shown below:

<u>Column 2,</u>
Line 34, "measuring" should read -- ¶ measuring --.

<u>Column 6,</u>
Line 49, "deposits" should read -- deposit --; and
Line 58, "rotating" should read -- rotated --.

<u>Column 7,</u>
Line 5, "be" should be deleted; and
Line 7, "reaches." should read -- reaches such point of contact. --.

<u>Column 9,</u>
Line 5, "control" should read -- Control --.

<u>Column 10,</u>
Line 44, "source" should read -- Source --; and
Lines 53 and 60, "to" should read -- as --.

<u>Column 11,</u>
Line 4, "to" should read -- as --;
Line 52, "images" should read -- images with --; and
Line 56, "PPRNT" should read -- PRNT --.

<u>Column 13,</u>
Lines 15 and 54, "to" should read -- as --.

<u>Column 14,</u>
Line 18, "time" should be deleted;
Line 19, "of" (first occurrence) should be deleted; and
Line 47, "to" (first occurrence) should read -- as --.

<u>Column 16,</u>
Line 20, "at present not any command which is" should read -- no --.

<u>Column 20,</u>
Line 62, "about" should be deleted.

UNITED STATES PATENT AND TRADEMARK OFFICE
CERTIFICATE OF CORRECTION

PATENT NO. : 6,185,384 B1
DATED : February 6, 2001
INVENTOR(S) : Koichi Ishimoto It is certified that error appears in the above-identified patent and that said Letters Patent is hereby corrected as shown below:

Column 21,
Line 7, "it" should read -- it, --; and
Line 44, "not" should read -- no --.

Column 22,
Line 24, "and" (first occurrence) should be deleted; and
Line 43, "an" should be deleted.

Signed and Sealed this

Twenty-second Day of July, 2003

JAMES E. ROGAN
*Director of the United States Patent and Trademark Office*